(12) United States Patent
Hayakawa et al.

(10) Patent No.: US 7,881,848 B2
(45) Date of Patent: Feb. 1, 2011

(54) LANE DEPARTURE PREVENTION APPARATUS AND METHOD

(75) Inventors: Yasuhisa Hayakawa, Yokohama (JP); Takeshi Iwasaka, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 924 days.

(21) Appl. No.: 11/790,553

(22) Filed: Apr. 26, 2007

(65) Prior Publication Data

US 2007/0255474 A1 Nov. 1, 2007

(30) Foreign Application Priority Data

Apr. 28, 2006 (JP) ............................. 2006-125414
Jul. 11, 2006 (JP) ............................. 2006-190599

(51) Int. Cl.
*G06G 7/76* (2006.01)
*G06F 17/10* (2006.01)

(52) U.S. Cl. .......................... 701/70; 701/41; 701/93; 701/301; 340/435; 257/48

(58) Field of Classification Search ................... 701/41, 701/301
See application file for complete search history.

(56) References Cited

U.S. PATENT DOCUMENTS

| 6,282,478 | B1 * | 8/2001 | Akita ........................ 701/70 |
| 6,732,021 | B2 | 5/2004 | Matsumoto et al. |
| 7,266,436 | B2 * | 9/2007 | Shirato et al. ................. 701/70 |
| 7,391,304 | B2 * | 6/2008 | Kataoka et al. ............. 340/435 |
| 7,542,840 | B2 * | 6/2009 | Kawakami et al. ............ 701/93 |
| 2004/0102884 | A1 | 5/2004 | Tange et al. |
| 2005/0167661 | A1 * | 8/2005 | Tawarayama et al. ......... 257/48 |
| 2006/0142922 | A1 * | 6/2006 | Ozaki et al. .................. 701/70 |
| 2006/0217860 | A1 * | 9/2006 | Ihara ............................ 701/41 |
| 2006/0217887 | A1 * | 9/2006 | Iwasaka ...................... 701/301 |

FOREIGN PATENT DOCUMENTS

| DE | 10352967 A1 * | 6/2005 |
| EP | 1 426 906 A1 | 6/2004 |
| EP | 1 531 112 A1 | 5/2005 |
| EP | 1 561 629 A | 8/2005 |
| EP | 1426906 B1 * | 3/2006 |
| JP | 2003-112540 | 4/2003 |
| JP | 2003-154910 | 5/2003 |

* cited by examiner

*Primary Examiner*—Thomas G Black
*Assistant Examiner*—Lin B Olsen
(74) *Attorney, Agent, or Firm*—Foley & Lardner LLP

(57) ABSTRACT

A lane departure prevention apparatus includes a control section configured to carry out a lane departure prevention control to prevent a vehicle from departing from a lane, and to finish the lane departure prevention control by using a predetermined finish parameter; a vehicle-state detecting section configured to detect a state of vehicle at least when or after the lane departure prevention control is started; and a control finish-parameter correcting section configured to correct the predetermined finish parameter on the basis of the vehicle state detected by the vehicle-state detecting section.

13 Claims, 19 Drawing Sheets

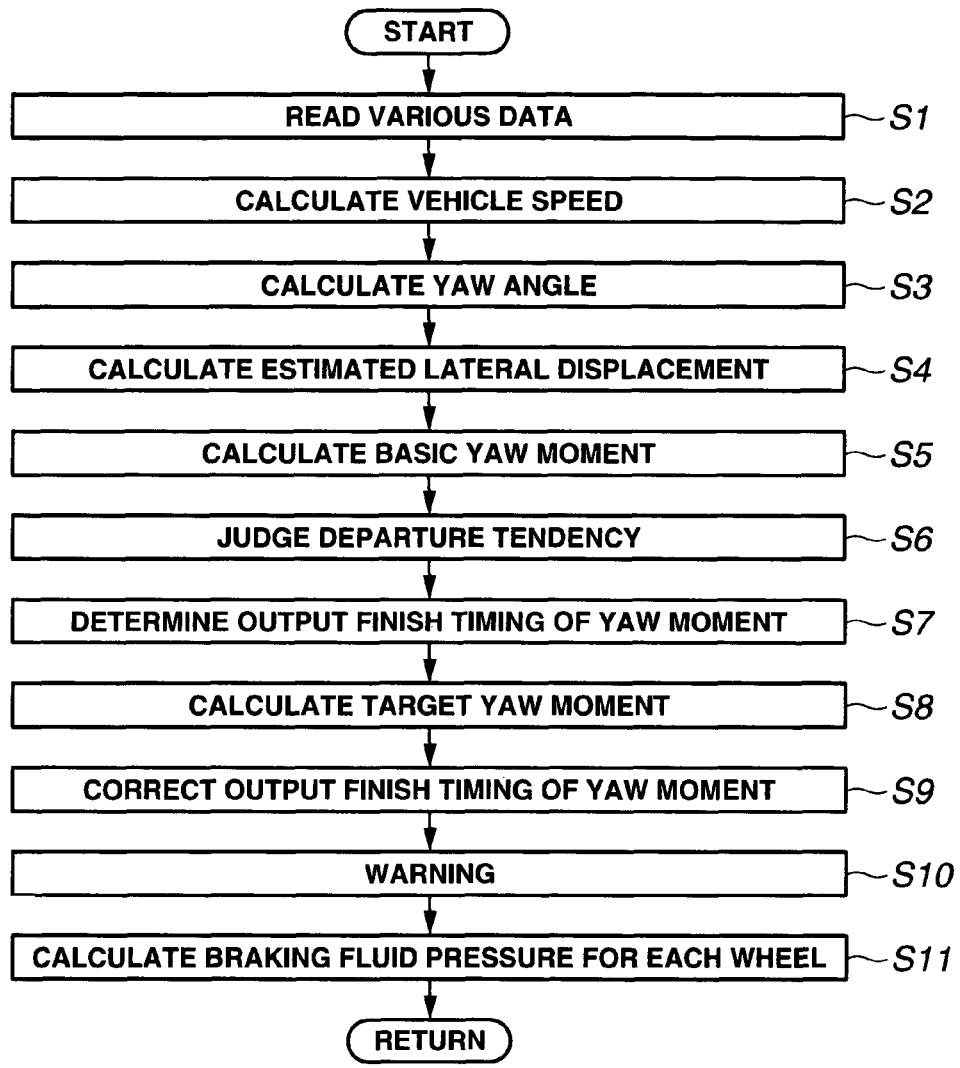
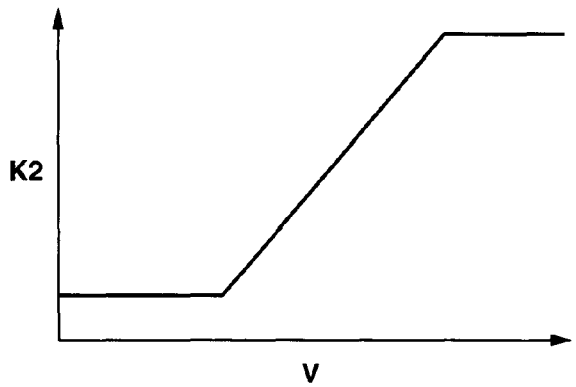

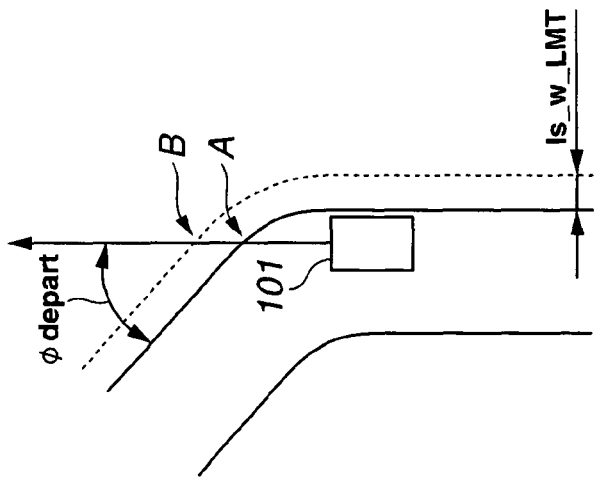
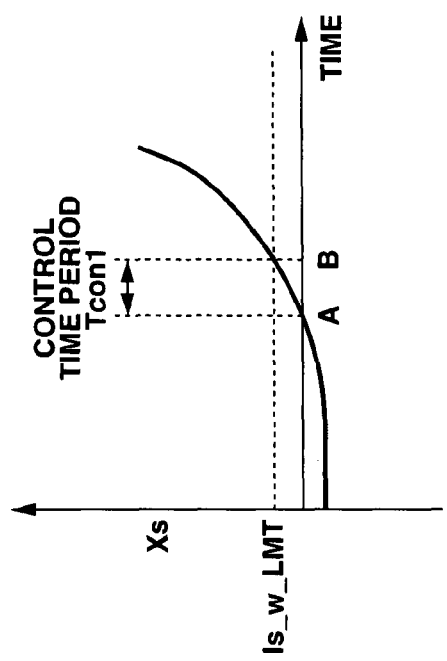
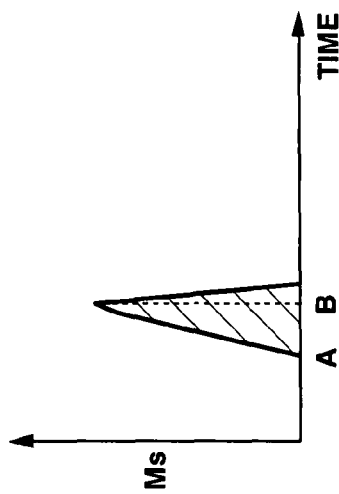

US 7,881,848 B2

LANE DEPARTURE PREVENTION APPARATUS AND METHOD

BACKGROUND OF THE INVENTION

The present invention relates to apparatus and/or method for preventing a vehicle from departing from a lane when the vehicle comes close to departing.

Japanese Patent Published Application No. 2003-154910 discloses a previously-proposed lane departure prevention apparatus which is adapted to prevent a vehicle from departing from a traveling lane by applying a yaw moment to the vehicle in the case where it is determined that the vehicle has a tendency to depart from the lane. Moreover, Japanese Patent Published Application No. 2003-112540 discloses another previously-proposed lane departure prevention apparatus.

SUMMARY OF THE INVENTION

However, there is a possibility that a driver perceives a time period of lane departure prevention control to be short as compared with a magnitude of yaw angle, in the case where the lane departure prevention control is carried out under the situation where the yaw angle of vehicle relative to the traveling lane becomes large, for example, when the vehicle is running at an entrance (beginning) of a curve. Namely, a time period during which the passenger is receiving a control feeling of lane departure prevention control becomes short, and thereby the lane departure prevention control brings an uncomfortable feeling to the passenger. Accordingly, it is conceivable that the time period during which the passenger is receiving the control feeling of lane departure prevention control is elongated by making a start timing of lane departure prevention control earlier than its normal timing. However, in this case; an execution frequency of lane departure prevention control is made high on a normal traveling road (e.g., straight pathway), and thereby the lane departure prevention control brings an uncomfortable feeling to the passenger.

It is an object of the present invention to provide lane departure prevention apparatus and method, devised to fit the lane departure prevention control in the control feeling of passenger.

According to one aspect of the present invention, there is provided a lane departure prevention apparatus comprising: a control section configured to carry out a lane departure prevention control to prevent a vehicle from departing from a lane, and to finish the lane departure prevention control by using a predetermined finish parameter; a vehicle-state detecting section configured to detect a state of vehicle at least when or after the lane departure prevention control is started; and a control finish-parameter correcting section configured to correct the predetermined finish parameter on the basis of the vehicle state detected by the vehicle-state detecting section.

According to another aspect of the present invention, there is provided a lane departure prevention apparatus comprising: first means for carrying out a lane departure prevention control to prevent a vehicle from departing from a lane, and finishing the lane departure prevention control by using a predetermined finish parameter; second means for detecting a state of vehicle at least when or after the lane departure prevention control is started; and third means for correcting the predetermined finish parameter on the basis of the vehicle state detected by the second means.

According to still another aspect of the present invention, there is provided a lane departure prevention method comprising: starting a lane departure prevention control to prevent a vehicle from departing from a lane; detecting a state of vehicle at least when or after the lane departure prevention control is started; correcting a predetermined finish parameter of the lane departure prevention control on the basis of the detected vehicle state; and finishing the lane departure prevention control by using the predetermined finish parameter.

The other objects and features of this invention will become understood from the following description with reference to the accompanying drawings.

BRIEF DESCRIPTION OF THE DRAWINGS

FIG. 2 is a flowchart showing processing contents that are executed by a control unit of a lane departure prevention apparatus for the vehicle.

FIG. 3 is a characteristic view showing the relation between a gain K2 and a vehicle speed V.

FIG. 12A is a view showing a control range of lane departure prevention control in the case where the control range of lane departure prevention control is not corrected. FIG. 12B is a view showing a control time period $T_{con}1$ of lane departure prevention control. FIG. 12C is a view showing a variation of target yaw moment $M_S$ during the lane departure prevention control.

DETAILED DESCRIPTION OF THE INVENTION

Figure 1:
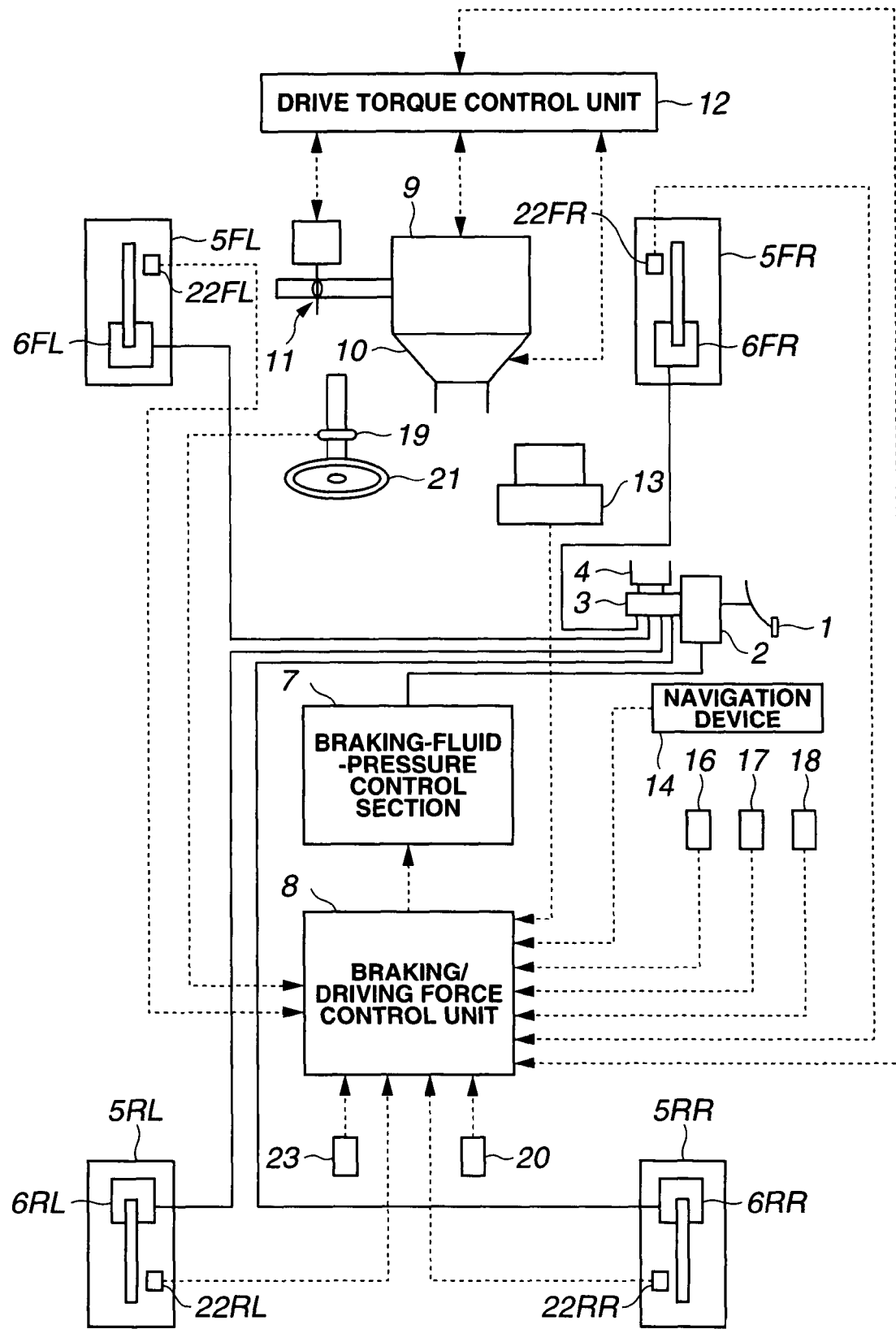
FIG. 1 is a diagram showing a schematic structure of vehicle in embodiments according to the present invention.

Reference will hereinafter be made to the drawings in order to facilitate a better understanding of the present invention. Embodiments according to the present invention will be explained in detail referring to the drawings.

First Embodiment (Structures)

In a first embodiment of the present invention, a rear-wheel drive vehicle equipped with the lane departure (deviation) prevention apparatus according to the present invention is exemplified. The rear-wheel drive vehicle is equipped with an automatic transmission, a conventional differential gear, and a braking system capable of independently controlling braking forces of left and right wheels of the front end and also capable of independently controlling braking forces of left and right wheels of the rear end.

FIG. 1 is a schematic structural diagram showing the first embodiment. As shown in FIG. 1, the braking system includes a brake pedal 1, a booster 2, a master cylinder(s) 3, and a reservoir 4. Generally, braking fluid pressure boosted by master cylinder 3 is supplied to wheel cylinders 6FL to 6RR of respective wheels 5FL to 5RR in accordance with the degree of depression of brake pedal 1 by a driver. A braking-fluid-pressure control section 7 is provided between master cylinder 3 and the respective wheel cylinders 6FL to 6RR. Braking-fluid-pressure control section 7 may individually control the braking fluid pressures of respective wheel cylinders 6FL to 6RR.

For example, a braking-fluid-pressure control section used for antiskid control (ABS), traction control (TCS), or vehicle dynamics control system (VDC) may be used for braking-fluid-pressure control section 7. Braking-fluid-pressure control section 7 can control (boost up and reduce) the braking fluid pressures of the respective wheel cylinders 6FL to 6RR, all by itself. However, braking-fluid-pressure control section 7 is also configured to control the braking fluid pressures of the respective wheel cylinders 6FL to 6RR in accordance with the value of a braking-fluid-pressure command sent from a braking/driving force control unit 8 as described below, when braking-fluid-pressure control section 7 receives the braking-fluid-pressure command value from braking/driving force control unit 8. For example, braking-fluid-pressure control section 7 includes an actuator in its fluid pressure supply system. An example of this actuator may be a proportional solenoid valve which can control the fluid pressure of each wheel cylinder to any (desired) braking fluid pressure.

The vehicle is provided with a drive torque control unit 12. Drive torque control unit 12 controls drive torques for rear wheels 5RL and 5RR serving as drive wheels, by controlling the operational status of an engine 9, a selected speed-change ratio (transmission ratio) of automatic transmission 10, and the throttle opening of a throttle valve 11. Drive torque control unit 12 can control the operational status of engine 9, for example, by controlling a volume of fuel injection or an ignition timing, or by adjusting the throttle opening at the same time. Drive torque control unit 12 outputs the value of drive torque(s) $T_W$ which was used for the control, to braking/driving (braking-and-driving) force control unit 8.

This drive torque control unit 12 alone (by itself) can control the drive torques of rear driving wheels 5RL and 5RR, however also can control the drive torques of driving wheels 5RL and 5RR in accordance with a drive-torque command value(s) when drive torque control unit 12 receives the drive-torque command value from braking/driving force control unit 8. Moreover, the vehicle is provided with an image pickup section 13 having an image processing function. Image pickup section 13 is used for detecting that the vehicle is tending to depart from a lane of travel, and serves to detect a position of the vehicle in its traveling lane (running lane). Image pickup section 13 includes a monocular camera having a CCD (Charge Coupled Device) camera adapted to take the image of an area ahead of the vehicle. Image pickup section (front camera) 13 is installed at a front part of the vehicle.

Image pickup section 13 detects (printed) lane markers such as white lines from the image of the front side (area) of vehicle and detects the traveling lane on the basis of the detected white lines. Moreover, image pickup section 13 calculates an angle (yaw angle) $\phi_{front}$ formed by the traveling lane of the vehicle and a front-rear axis of the vehicle, a lateral displacement $X_{front}$ of the vehicle from a center of the lane, a lane curvature β, and the like, on the basis of the detected lane.

Thus, image pickup section 13 detects the white lines defining the traveling lane (cruising lane) and calculates yaw angle $\phi_{front}$ on the basis of the detected white lines. Image pickup section 13 outputs the calculated yaw angle $\beta_{front}$, lateral displacement $X_{front}$, lane curvature β (or road radius), and the like to braking/driving force control unit 8. In this embodiment, it is noted that the lane markers (white lines) may be detected by a detecting means other than the image processing. For example, the lane markers may be sensed by a plurality of infrared sensors attached to the front of the vehicle, and then the traveling lane may be detected based on this sensing result of lane markers.

Moreover, this embodiment is not limited to the configuration determining the lane from the white lines. Namely, in the case where the white lines (lane markers) serving to give the recognition of traveling lane do not exist on a traveling road; a configuration may be employed which estimates a range of traveling road suitable for the running (traveling) of vehicle or a range of traveling road within which the driver should drive the vehicle, on the basis of the information of a road shape, a surrounding environment, or the like obtained by the image processing or various sensors. Then, the estimated range of traveling road may be determined as the traveling lane. For example, in the case where the white lines are not printed on the road, and both ends of the road form cliffs (i.e., have steep drops); a portion of the traveling road which is surfaced with asphalt is defined as the traveling lane. Moreover, in the case where a guardrail, a curbstone, or the like exists; the traveling lane can be determined or defined in consideration of the information of this existence.

Note that lane curvature β may be calculated based on an after-mentioned steering angle δ of a steering wheel 21. The vehicle is also equipped with a navigation (system) device 14. Navigation device 14 detects a longitudinal acceleration Yg and/or a lateral acceleration Xg generated in the vehicle, or a yaw rate φ' generated in the vehicle. Navigation device 14 outputs the detected longitudinal acceleration Yg, lateral acceleration Xg, and yaw rate φ'(=dφ/dt) along with road information to braking/driving force control unit 8. Here, the road information includes a lane number and the road type information indicating a road category such as ordinary road or express way. Moreover, these longitudinal acceleration Yg, lateral acceleration Xg, and yaw rate φ' may be sensed by sensors for exclusive use. Namely, longitudinal acceleration Yg and lateral acceleration Xg may be sensed by an acceleration sensor, and yaw rate φ' may be sensed by a yaw rate sensor.

Further, the vehicle is provided with a radar 16 for measuring, e.g., a distance between the vehicle and an obstacle ahead. Radar 16 measures the distance and the like by applying and sweeping a laser light to the obstacle ahead and then by receiving its reflected light from the obstacle. Then, radar 16 outputs the information about a position of obstacle ahead, to braking/driving force control unit 8. The detected result by radar 16 is used for the processing in a following cruise control (adaptive cruise control), a collision speed-reducing brake unit, or the like.

Further, the vehicle is provided with a master cylinder pressure sensor 17 for sensing an output pressure of master cylinder 3, that is, a master cylinder fluid pressure Pm; an accelerator opening sensor 18 for sensing the degree of depression of an accelerator pedal, that is, an accelerator opening θ; a steering angle sensor 19 for sensing steering angle (rudder angle for steering) δ of steering wheel 21; a direction indicator switch 20 for sensing a direction indicating operation of a direction indicator; and wheel speed sensors 22FL to 22RR for sensing rotational speeds of the respective vehicle wheels 5FL to 5RR, that is, so-called wheel speeds Vwi (i=fl, fr, rl, rr). The signals sensed by these sensors and the like are outputted to braking/driving force control unit 8.

Next, a computing process (processing routine) executed by braking/driving force control unit 8 will be now described. FIG. 2 is a flowchart showing procedure steps of this computing process. This computing process is executed by means of a timer interruption every predetermined sampling period of time ΔT, for example, 10 milliseconds. Although a communication process is not specifically described in the computing process shown in FIG. 2, the information obtained through the computing process is updated and stored in a storage device on an as-needed basis and necessary information is read out from the storage device at any time on an as-needed basis.

As shown in FIG. 2, at step S1 of the computing process, various data are read out from the above-mentioned respective sensors, controller, and control units. Concretely, braking/driving force control unit 8 reads longitudinal acceleration Yg, lateral acceleration Xg, yaw rate φ', and the road information which are obtained by navigation device 14; respective wheel speeds Vwi, steering angle δ, accelerator opening θ, master cylinder fluid pressure Pm, and the signal of direction indicator switch which are detected by the respective sensors; drive torque $T_W$ which is derived from drive torque control unit 12; and lateral displacement $X_{front}$ and lane curvature β which are derived from image pickup section 13.

Subsequently at step S2, a vehicle speed V is calculated. Specifically, vehicle speed V is calculated from the following Equations (1) on the basis of wheel speeds Vwi read out at step S1.

In the case of front-wheel drive, $V=(Vwrl+Vwrr)/2$

In the case of rear-wheel drive, $V=(Vwfl+Vwfr)/2$ (1)

Here, Vwfl and Vwfr are the wheel speeds of respective left and right front wheels, and Vwrl and Vwrr are the wheel speeds of respective left and right rear wheels. Namely, vehicle speed V is calculated as an average value of the wheel speeds of driven wheels in these Equations (1). Since the rear-wheel drive vehicle is exemplified in this embodiment, vehicle speed V is calculated from the latter Equation, namely from the wheel speeds of front wheels.

Vehicle speed V calculated as described above is preferably used at the time of normal running. For example, when an ABS (Anti-lock Brake System) control is in operation, a vehicle-body speed estimated under the ABS control is used as the above-mentioned vehicle speed V.

Subsequently at step S3, yaw angle $\phi_{front}$ is calculated. Specifically, yaw angle $\phi_{front}$ of the vehicle is calculated relative to the white lines continuing (extending) far way which are detected by image pickup section 13.

Although thus-calculated yaw angle $\phi_{front}$ is an actual measurement value of image pickup section 13, yaw angle $\phi_{front}$ also can be calculated on the basis of the nearby white lines (i.e., white lines near the vehicle) imaged by image pickup section 13 instead of the usage of actual measurement value. Namely for example, yaw angle $\phi_{front}$ is calculated from the following Equation (2) by using lateral displacement $X_{front}$ read out at step S1.

$$\phi_{front}=\tan^{-1}(V/dX'(=dY/dX)) \quad (2)$$

Where dX denotes a variation (change amount) of lateral displacement X per unit time, dY denotes a variation in a traveling direction per unit time, dX' denotes a derivative value of variation dX, and V denotes the vehicle speed calculated at step S2.

In the case where yaw angle $\phi_{front}$ is calculated based on the nearby white lines, its calculation method is not limited to the above-mentioned method in which yaw angle $\phi_{front}$ is calculated by using lateral displacement X as shown in Equation (2). For example, also by elongating or extending far away the nearby white lines detected in proximity to the vehicle, yaw angle $\phi_{front}$ can be calculated based on these elongated white lines.

Subsequently at step S4, an estimated (future) lateral displacement is calculated. Specifically, estimated lateral displacement $X_S$ is calculated from the following Equation (3), by using traveling lane curvature β and current lateral displacement $X_{front}$ of vehicle which are obtained at step S1, vehicle speed V obtained at step S2, and yaw angle $\phi_{front}$ obtained at step S3.

$$X_S = Tt \cdot V \cdot (\phi_{front} + Tt \cdot V \cdot \beta) + X_{front} \quad (3)$$

Where Tt denotes a headway time for calculating a front focal point distance. The front focal point distance is obtained by multiplying headway time Tt by vehicle speed V. Namely, an estimated value of the lateral displacement from the center of traveling lane after the lapse of headway time Tt is estimated lateral displacement $X_S$ in the future. As recognized in Equation (3), estimated lateral displacement $X_S$ becomes larger as yaw angle $\phi_{front}$ becomes larger.

Subsequently at step S5, braking/driving force control unit 8 calculates a yaw moment (hereinafter, referred to as basic yaw moment) which is applied to the vehicle as the lane departure prevention (avoidance) control. In the lane departure prevention control, when the vehicle tends to depart or deviate relative to the traveling lane (i.e., when there is a prediction that the vehicle departs from the traveling lane in near future), the vehicle is prevented from departing from the traveling lane by applying a predetermined yaw moment (predetermined control quantity (manipulated variable) for the lane departure avoidance) to the vehicle. At step S5, this yaw moment (basic yaw moment $M_S0$) is calculated based on the actual running state.

Specifically, basic yaw moment $M_S0$ is calculated from the following Equation (4) on the basis of estimated lateral displacement $X_S$ obtained at step S4 and a lateral displacement limit distance (length) $X_L$.

$$M_S0 = K1 \cdot K2 \cdot (|X_S| - X_L) \quad (4)$$

Where K1 denotes a proportional gain determined from vehicle specifications, and K2 denotes a gain which varies according to vehicle speed V. FIG. 3 shows one example of gain K2. As shown in FIG. 3, for example, gain K2 is relatively small in a low speed region, then increases in response to the increase of vehicle speed V after vehicle speed V has reached a certain value, and then becomes a relatively large constant value when vehicle speed V reaches the other certain value.

As recognized in Equation (4), basic yaw moment $M_S0$ becomes larger as the difference between estimated lateral displacement $X_S$ and lateral displacement limit distance $X_L$ becomes larger. Moreover, basic yaw moment $M_S0$ becomes larger as yaw angle $\phi_{front}$ becomes larger, from the relation between estimated lateral displacement $X_S$ and yaw angle $\phi_{front}$ (see Equation (3)). Basic yaw moment $M_S0$ is calculated from Equation (4) when an after-mentioned departure judgment flag $F_{out}$ set at step S6 is in "ON" status. On the other hand, basic yaw moment $M_S 0$ is set to 0 when departure judgment flag $F_{out}$ is in "OFF" status.

Figure 4:
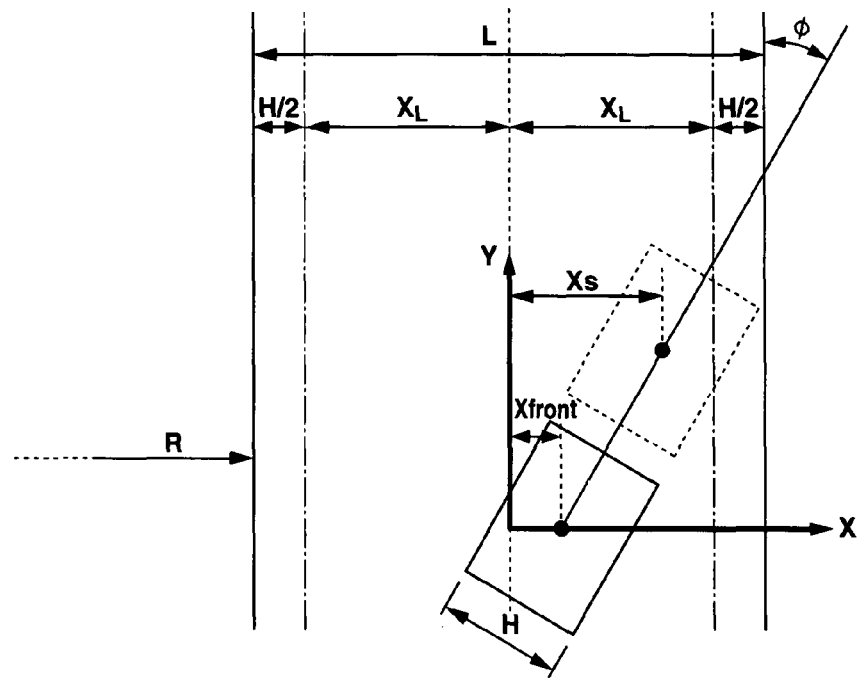
FIG. 4 is a view used for explaining an estimated lateral displacement $X_S$ and a departure-tendency determining threshold value $X_L$.

Subsequently at step S6, control unit 8 judges whether or not the vehicle is tending to depart from the traveling lane (i.e., whether or not there is a prediction that the vehicle would depart from the traveling lane anytime soon). Specifically, the departure tendency is judged by comparing estimated lateral displacement $X_S$ obtained at step S4, with a departure-tendency determining threshold value $X_L$ which is lateral displacement limit distance $X_L$ used for the calculation of basic yaw moment $M_S0$ at step S5. FIG. 4 shows definitions of parameters which are used in this computing process.

Departure-tendency determining threshold value (lateral displacement limit distance) $X_L$ is the value from which it can be generally determined that the vehicle tends to depart from the traveling lane. This departure-tendency determining threshold value $X_L$ is a value obtained through experimental trials and experiences. For example, departure-tendency determining threshold value $X_L$ is a value indicating the position of a boundary in the traveling lane and is calculated from the following Equation (5).

$$X_L = (L - H)/2 \quad (5)$$

Where L denotes a lane width (i.e., width between white lines defining the traveling lane) of traveling lane, and H denotes a width of the vehicle. Image pickup section 13 obtains lane width L by processing the pickup image.

When estimated lateral displacement $X_S$ is greater than or equal to departure-tendency determining threshold value $X_L$ ($|X_S| \geq X_L$); it is determined that the vehicle has the tendency to depart from the lane, and departure judgment flag $F_{out}$ is set to ON. When estimated lateral displacement $X_S$ is smaller than departure-tendency determining threshold value $X_L$ ($|X_S| < X_L$); it is determined that the vehicle does not have the tendency to depart from the lane, and departure judgment flag $F_{out}$ is set to OFF. Note that this judgment on the lane departure tendency can be also conducted by using actual lateral displacement $X_{front}$ (i.e., estimated lateral displacement $X_S$ in the case of Tt=0) instead of estimated lateral displacement (position) $X_S$. In this case, when actual lateral displacement $X_{front}$ is greater than or equal to departure-tendency determining threshold value $X_L$ ($|X_{front}| \geq X_L$); it is determined that the vehicle has the tendency to depart from the lane, and departure judgment flag $F_{out}$ is set to ON.

Further, when the vehicle becomes in the state where the vehicle does not have the tendency to depart from the lane ($|X_S| < X_L$ or $|X_{front}| < X_L$) after setting departure judgment flag $F_{out}$ to ON; departure judgment flag $F_{out}$ can be set to OFF. Moreover, a time criterion (parameter) may be added to this judgment. For example, when a predetermined time period has elapsed after setting departure judgment flag $F_{out}$ to ON; departure judgment flag $F_{out}$ may be set to OFF.

After setting departure judgment flag $F_{out}$ as mentioned above, a departure direction $D_{out}$ is determined based on lateral displacement X. Specifically, when the vehicle is laterally displaced to the left from the center of traveling lane, the left direction is set as departure direction $D_{out}$ ($D_{out}$=LEFT). On the other hand, when the vehicle is laterally displaced to the right from the center of traveling lane, the right direction is set as departure direction $D_{out}$ ($D_{out}$=RIGHT). Note that departure judgment flag $F_{out}$ may be set at OFF in order not to activate the lane departure prevention control, while antiskid control (ABS), traction control (TCS), or vehicle dynamics control system (VDC) is in operation.

Further, departure judgment flag $F_{out}$ may be set finally in consideration of the driver's intention of lane change. For example, when the direction (lighting side of a winker) indicated by the signal of direction indicator switch 20 is the same as the departure direction $D_{out}$; it is determined that the driver is intentionally changing the lanes, and departure judgment flag $F_{out}$ is changed to OFF. Namely, the information on the lane departure tendency is changed to the judgment result that the vehicle does not have the tendency to depart from the lane. On the other hand, when the direction (lighting side of winker) indicated by the signal of direction indicator switch 20 is different from departure direction $D_{out}$; departure judgment flag $F_{out}$ is maintained at ON. Namely, the judgment result that the vehicle has the tendency to depart from the lane is maintained.

Moreover, in the case where direction indicator switch 20 is not actuated, departure judgment flag $F_{out}$ is set finally based on steering angle δ. Namely in the case where the driver is steering the vehicle in the departure direction, when both of its steering angle δ and a variation (variation per unit time) Δδ of this steering angle δ are greater than or equal to predetermined values; it is determined that the driver is intentionally changing the lanes, and departure judgment flag $F_{out}$ is changed to OFF.

Subsequently at step S7, control unit 8 determines a finish timing at which the lane departure prevention control finishes outputting (producing) or applying the yaw moment to the vehicle. By the above-mentioned judgment on the departure tendency at step S6, the determination that the vehicle has the lane departure tendency is removed or changed ($F_{out}$=OFF), for example when the vehicle returns to (a proper range of) the traveling lane or when the vehicle changes the lanes with the driver's intention. Thereby, the lane departure prevention (avoidance) control is finished, namely it is finished or stopped to output (apply) the yaw moment to the vehicle. At this step S7, separately in addition to such judgment on the departure tendency, control unit 8 determines the finish timing of lane departure prevention control. Namely, when the magnitude of lateral displacement of the vehicle relative to the traveling lane becomes greater than or equal to a predetermined magnitude, the lane departure prevention control is finished. Specifically, an output-finish determining threshold value $X_{end}$ for determining the finish (finish position) of output (applying) of the yaw moment is provided. Then, when actual lateral displacement $X_{front}$ is greater than or equal to output-finish determining threshold value $X_{end}$ ($|X_{front}| \geq X_{end}$); it is determined that the lane departure prevention control has reached its finish timing, and departure judgment flag $F_{out}$ is set to OFF.

Figure 5:
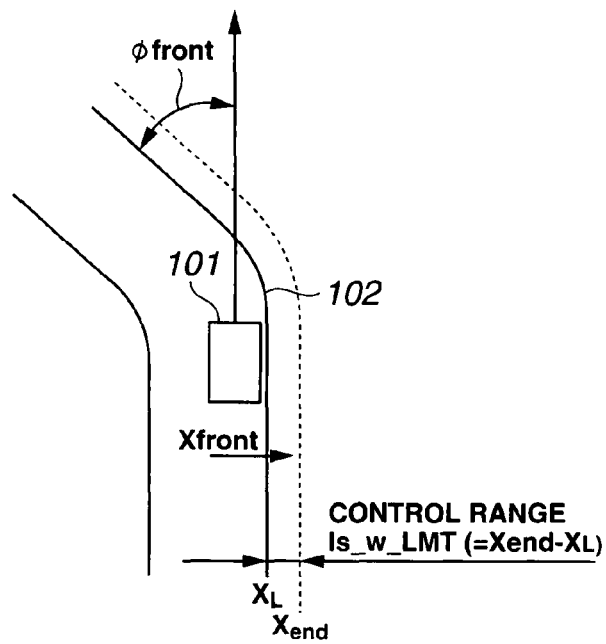
FIG. 5 is a view showing the relation among a vehicle position, departure-tendency determining threshold value $X_L$, and an output-finish determining threshold value $X_{end}$.

FIG. 5 shows the relation among the position of the vehicle 101, departure-tendency determining threshold value $X_L$, and output-finish determining threshold value $X_{end}$. When (lateral displacement $X_S$ or $X_{front}$ of) vehicle 101 exceeds departure-tendency determining threshold value $X_L$ corresponding to a position of white line 102 or the proximity of white line 102 shown in FIG. 5 (or when vehicle 101 is predicted to exceed departure-tendency determining threshold value $X_L$ anytime soon), the lane departure prevention control is started by applying the yaw moment to vehicle 101. Then, when (lateral displacement $X_S$ or $X_{front}$ of) vehicle 101 reaches output-finish determining threshold value $X_{end}$ shown in FIG. 5, the lane departure prevention control is finished by stopping applying the yaw moment to vehicle 101. Therefore, a value $I_{S\_W}$_LMT (=$X_{end}$–$X_L$) obtained by subtracting departure-tendency determining threshold value $X_L$ from output-finish determining threshold value $X_{end}$ forms or means a control range of lane departure prevention control.

Subsequently at step S8, control unit 8 sets a target yaw moment which is finally used as a control command value. The lane departure prevention control according to this embodiment is based on the premise that the processing routine (processing routine of FIG. 2) for lane departure prevention control is carried out repeatedly until the completion of lane departure avoidance, namely, is based on the premise that the vehicle is prevented from departing from the lane by applying the yaw moment (concretely, target yaw moment $M_S$) to the vehicle continuously in sequence. Thus, the yaw moment (control quantity) gradually increases and then gradually decreases, by the successive processing routines which are carried out during the period between the start and finish of lane departure prevention control. At this step S8, on the premise of such output pattern of yaw moment, target yaw moment $M_S$ is calculated by imposing a limiter processing to basic yaw moment $M_S0$ calculated at step S5. Accordingly, at first, a limiter for the limiter processing is set as prescribed values.

Figure 6:
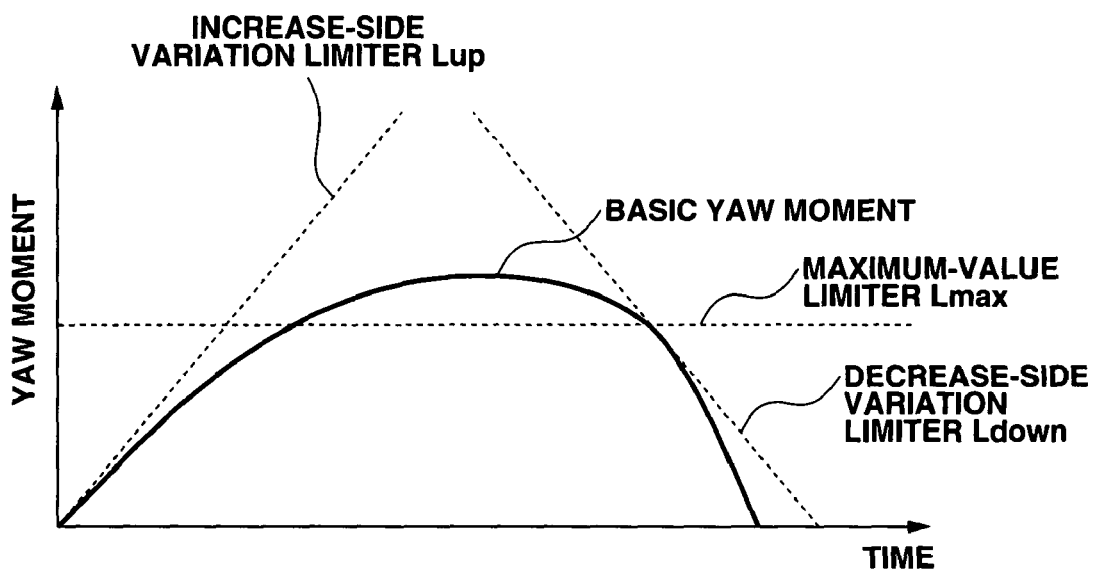
FIG. 6 is a characteristic view showing a time variation of basic yaw moment $M_S0$.

FIG. 6 shows a variation of basic yaw moment $M_S0$ with respect to time. As shown in FIG. 6, an increase-side variation limiter $L_{up}$ is set as a limiter for limiting or suppressing an increase rate of basic yaw moment $M_S0$ in an increasing side (values during first half of control or starting stage of control), a maximum-value limiter $L_{max}$ is set as a limiter for limiting or suppressing a maximum value (values during middle stage of control) of basic yaw moment $M_S0$, and a decrease-side variation limiter $L_{down}$ is set as a limiter for limiting or suppressing a decrease rate of basic yaw moment $M_S0$ in a decreasing side (values during second half of control or finishing stage of control).

Here, each value of increase-side variation limiter $L_{up}$ or decrease-side variation limiter $L_{down}$ corresponds to a variation amount during the time period of one processing routine of lane departure prevention control. Moreover, increase-side variation limiter $L_{up}$, maximum-value limiter $L_{max}$, and decrease-side variation limiter $L_{down}$ are respectively determined so as to smooth out the minimum yaw moment necessary to prevent the vehicle from departing from the traveling lane, on the basis of experimental trials and experiences.

Increase-side variation limiter $L_{up}$, maximum-value limiter $L_{max}$, and decrease-side variation limiter $L_{down}$ are respectively set as prescribed values as mentioned above. Target yaw moment $M_S$ is calculated by limiting or suppressing basic yaw moment $M_S0$ by using increase-side variation limiter $L_{up}$, maximum-value limiter $L_{max}$, and decrease-side variation limiter $L_{down}$.

Figure 7:
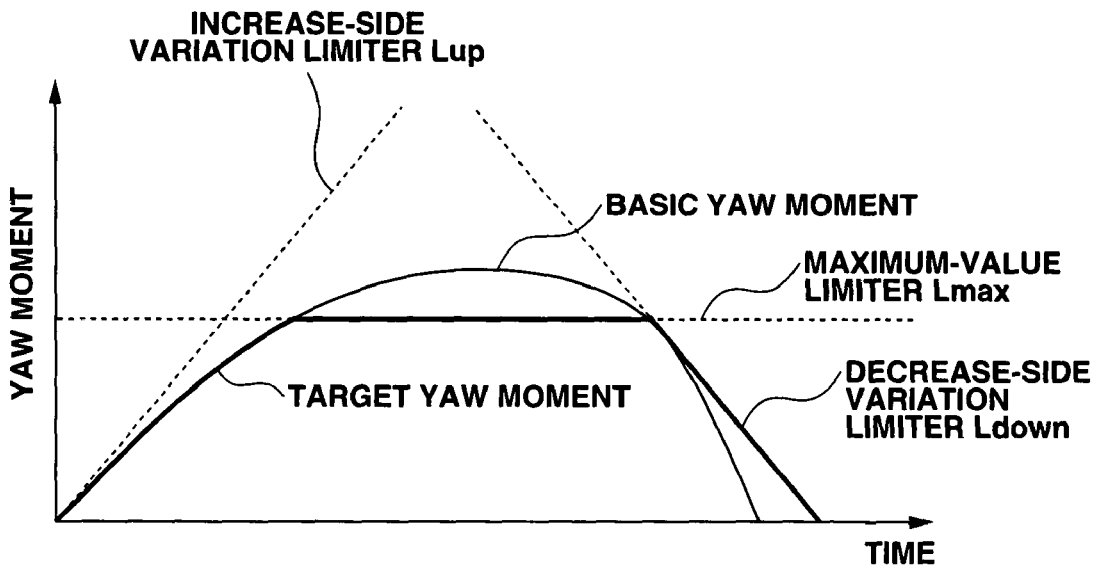
FIG. 7 is a characteristic view showing a time variation of target yaw moment $M_S$ obtained through a limiter processing.

FIG. 7 is a result obtained by limiting basic yaw moment $M_S0$ by means of these limiters $L_{up}$, $L_{max}$, and $L_{down}$. That is, FIG. 7 shows target yaw moment $M_S$. Note that a gradient (increase rate) of target yaw moment $M_S$ in its increasing side (region) becomes lower as increase-side variation limiter $L_{up}$ becomes lower, and a gradient (decrease rate) of target yaw moment $M_S$ in its decreasing side (region) becomes lower as decrease-side variation limiter $L_{down}$ becomes lower.

Figure 8:
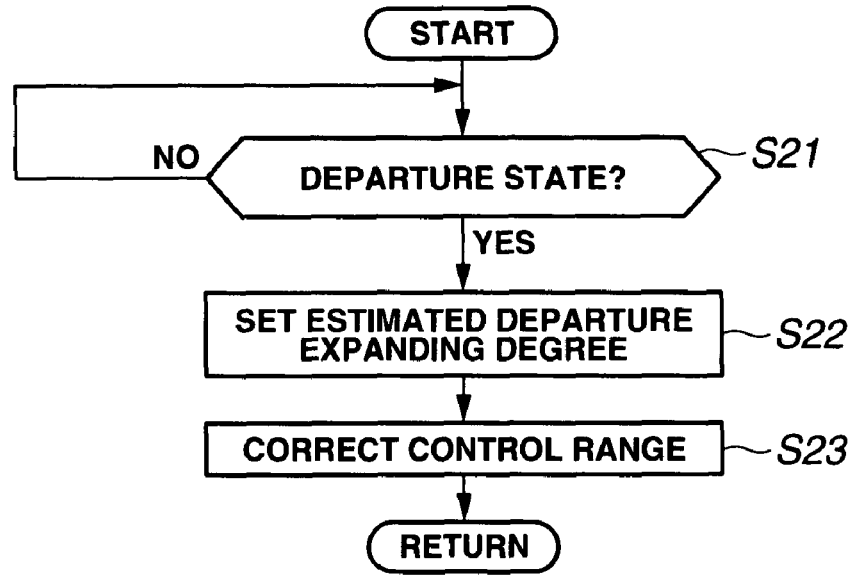
FIG. 8 is a flowchart showing processing contents for a correction of output finish timing of yaw moment that are executed by the control unit.

Subsequently at step S9, control unit 8 corrects the finish timing (predetermined parameter for control termination) of output (applying) of yaw moment to the vehicle which is conducted by the lane departure prevention control. Specifically, when the vehicle becomes in the departure state, namely when the departure tendency is determined; a departure expanding degree after this departure-tendency determination (i.e., future expanding degree of departure amount) is estimated. Then, on the basis of the estimated departure expanding degree, the output finish timing of yaw moment is corrected. FIG. 8 shows a procedure of this correction.

As shown in FIG. 8, at first at step S21, it is judged whether or not the vehicle has become in the lane-departure state, namely whether or not the lane departure tendency of vehicle has occurred. Specifically, it is judged whether or not departure judgment flag $F_{out}$ set at step S6 has been changed from OFF to ON. The process of S21 is repeated until it is determined that the vehicle is in the lane-departure state, namely until it is determined that the lane departure tendency of vehicle has occurred or started. If it is determined that the vehicle is in the lane-departure state, namely that the lane departure tendency of vehicle has occurred; the program proceeds to step S22.

At step S22, the departure expanding degree of vehicle relative to the traveling lane is calculated or estimated, from an attitude of vehicle relative to the traveling lane (white lines) at the time of the determination that the vehicle has become in the lane-departure state at step S21. At first, yaw angle $\phi_{depart}$ formed by the traveling lane (white lines) and the front-rear axis of vehicle is detected. This yaw angle $\phi_{depart}$ ($\phi_{depart}=\phi_{front}$) is detected by image pickup section 13. Then, an estimated departure expanding degree $EX_{depart}$ is set based on the detected yaw angle $\phi_{depart}$. Here, estimated departure expanding degree $EX_{depart}$ is the future departure-expanding degree which is estimated when the vehicle becomes in the lane-departure (tendency) state.

Figure 9:
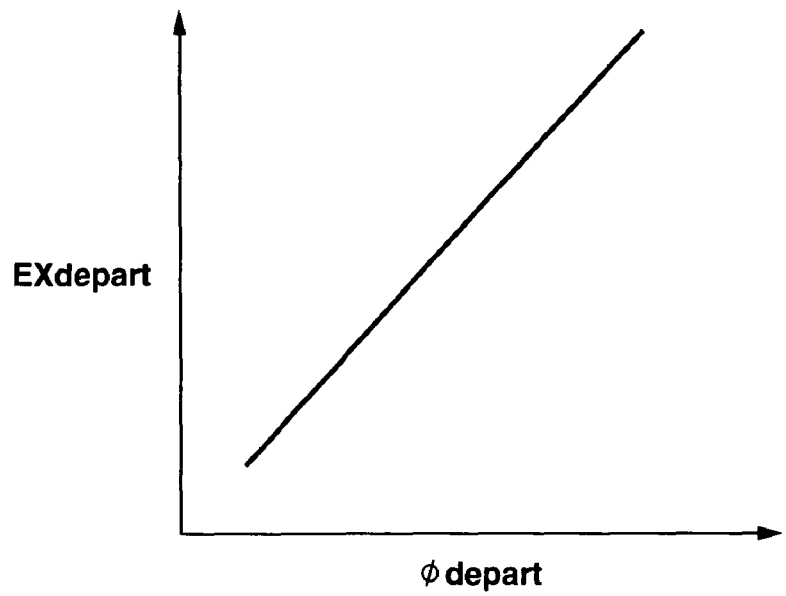
FIG. 9 is a characteristic view showing the relation between a yaw angle $\phi_{depart}$ and an estimated departure expanding degree $EX_{depart}$.
Figure 10A:
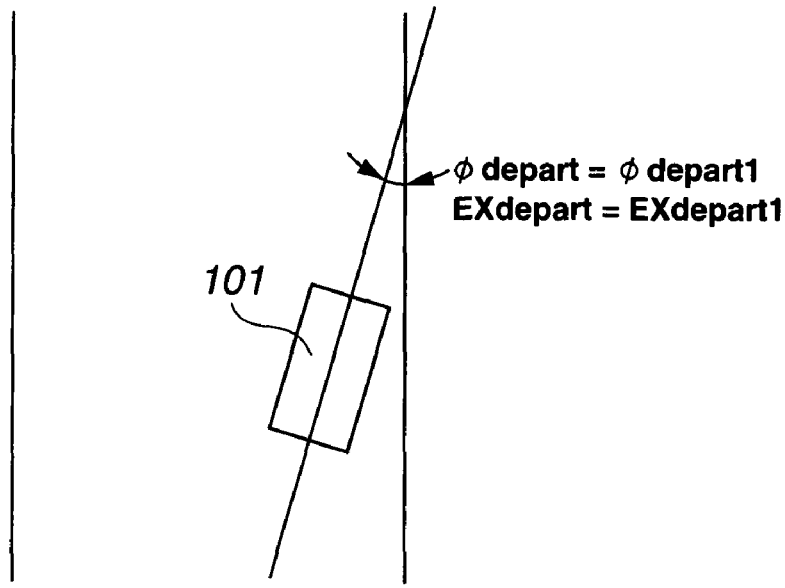
FIGS. 10A and 10B are views used for explaining the relation between yaw angle $\phi_{depart}$ and estimated departure expanding degree $EX_{depart}$.
Figure 10B:
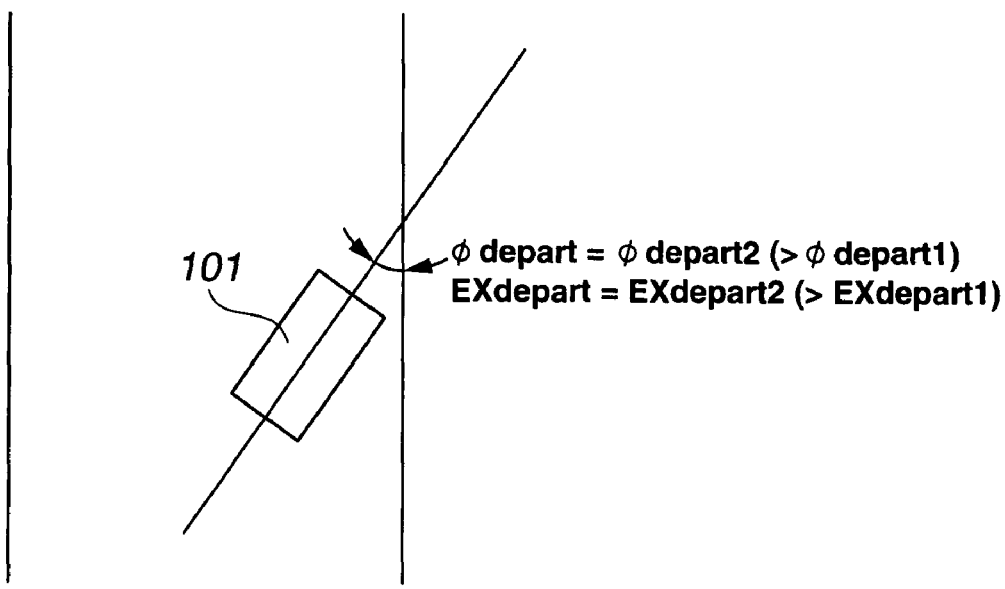

FIG. 9 shows an example of the relation between yaw angle $\phi_{depart}$ and estimated departure expanding degree $EX_{depart}$. As shown in FIG. 9, yaw angle $\phi_{depart}$ and estimated departure expanding degree $EX_{depart}$ form a proportional relation. Referring to such characteristic view, estimated departure expanding degree $EX_{depart}$ is set on the basis of yaw angle $\phi_{depart}$. Thus, for example as shown in FIGS. 10A and 10B, in a running (traveling) state of vehicle 101 illustrated by FIG. 10A, estimated departure expanding degree $EX_{depart}$ is set to estimated departure expanding degree $EX_{depart}1$ in accordance with yaw angle $\phi_{depart}$ taking a value of yaw angle $\phi_{depart}1$. On the other hand, in a running state of vehicle 101 illustrated by FIG. 10B, since yaw angle $\phi_{depart}$ takes a value of yaw angle $\phi_{depart}2$ ($>\phi_{depart}1$) greater than yaw angle $\phi_{depart}1$ of FIG. 10A, estimated departure expanding degree $EX_{depart}$ is set to estimated departure expanding degree $EX_{depart}2$ ($>EX_{depart}1$) greater than estimated departure expanding degree $EX_{depart}1$ of FIG. 10A, in accordance with yaw angle $\phi\text{depart}_2$.

Subsequently at step S23, the control range (output-finish determining threshold value $X_{end}$) for lane departure prevention control which is set at step S7 is corrected based on estimated departure expanding degree $EX_{depart}$ set at step S22. Specifically, a gain $K_{wlimt}$ for correcting the control range for lane departure prevention control is calculated based on estimated departure expanding degree $EX_{depart}$.

Figure 11:
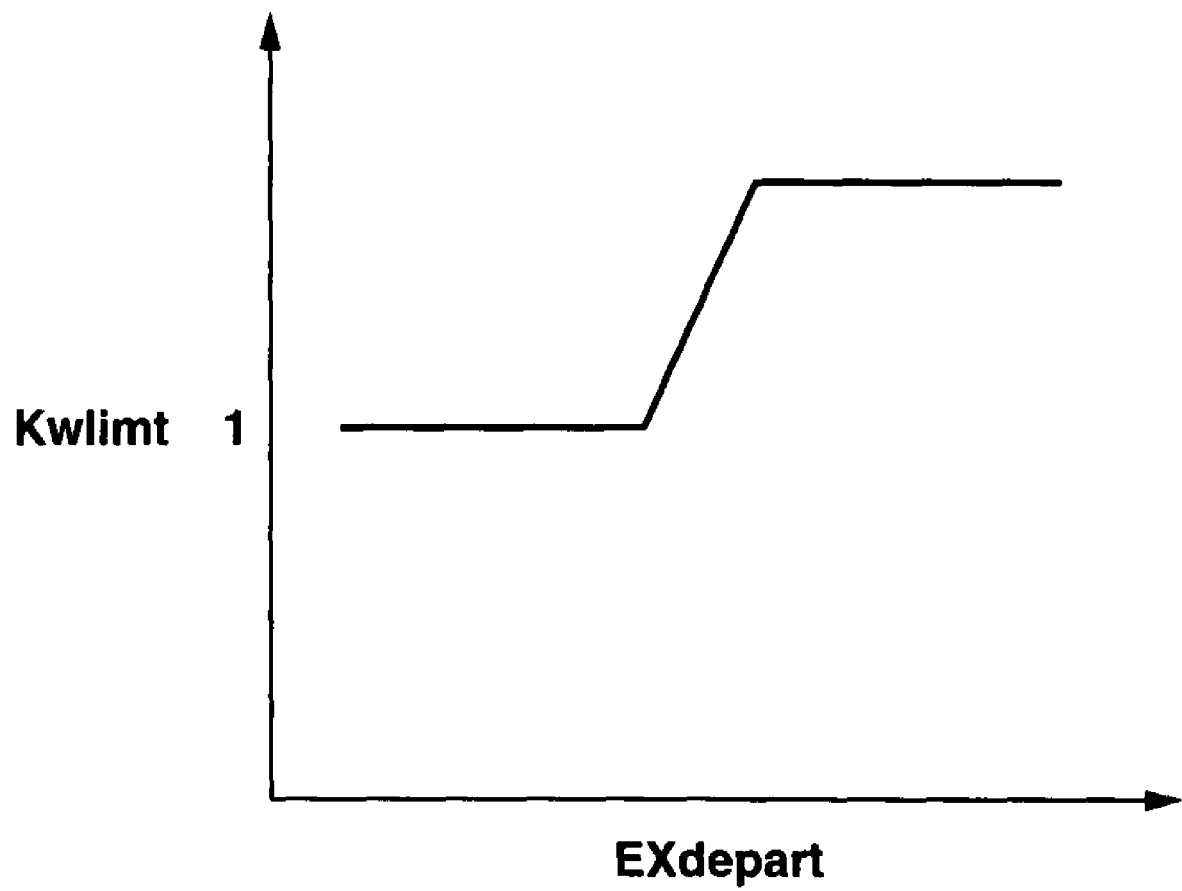
FIG. 11 is a characteristic view showing the relation between a gain $K_{wlimt}$ and estimated departure expanding degree $EX_{depart}$.

FIG. 11 is one example of the relation between gain $K_{wlimt}$ and estimated departure expanding degree $EX_{depart}$. As shown in FIG. 11, gain $K_{wlimt}$ is a constant small value ($K_{wlimt}=1$) in a small region of estimated departure expanding degree $EX_{depart}$. Then, gain $K_{wlimt}$ increases in response to the increase of estimated departure expanding degree $EX_{depart}$ after estimated departure expanding degree $EX_{depart}$ has reached a certain value. Then, gain $K_{wlimt}$ becomes a large constant value when estimated departure expanding degree $EX_{depart}$ reaches the other certain value. Referring to such characteristic view, gain $K_{wlimt}$ is set on the basis of estimated departure expanding degree $EX_{depart}$.

Thereby, output-finish determining threshold value $X_{end}$ is corrected based on thus-set gain $K_{wlimt}$. Specifically, the control range ($X_{end}-X_L=I_{S\_W\_}LMT$) is corrected from the following Equation (6).

$$\text{Control Range} = K_{wlimt} \cdot (X_{end} - X_L) \tag{6}$$

Accordingly, the control range (control area) is corrected and increased from $1\cdot(X_{end}-X_L)$ or $1\cdot I_{S\_W\_}LMT$ to $K_{wlimt}\cdot(X_{end}-X_L)$ or $K_{wlimt}\cdot I_{S\_W\_}LMT$ when gain $K_{wlimt}$ becomes great. Thereby, the control range is more enlarged or increased, as estimated departure expanding degree $EX_{depart}$ becomes great, namely as yaw angle $\phi_{depart}$ at the start time of lane departure (tendency) becomes great. Namely, output-finish determining threshold value $X_{end}$ defining the control range is enlarged by regarding departure-tendency determining threshold value $X_L$ as its base point.

Subsequently at step S10, a sound output or a display output is carried out as a warning for avoiding the lane departure when departure judgment flag $F_{out}$ is ON. When departure judgment flag $F_{out}$ becomes ON, namely when an absolute value $|M_S|$ of target yaw moment $M_S$ is greater than 0; the moment (target yaw moment $M_S$) starts to be applied to the vehicle as the lane departure prevention control, and hence this warning output is carried out at the same time as the applying of moment to the vehicle. However, the output timing of warning is not limited to this. For example, the output timing of warning may be set to a timing before the start timing for applying the yaw moment.

Subsequently at step S11, control unit 8 calculates a target braking fluid pressure for each wheel. Specifically, respective target braking fluid pressures are calculated from the following Equations. In the case where departure judgment flag $F_{out}$ is OFF, namely in the case where target yaw moment $M_S$ is equal to 0 (in the case where the lane departure prevention control is not carried out); target braking fluid pressures Psi (i=fl, fr, rl, rr) for respective wheels are set to a braking fluid pressure Pmf or a braking fluid pressure Pmr as shown in the following Equations (7) and (8).

$$\text{Psfl}=\text{Psfr}=\text{Pmf} \tag{7}$$

$$\text{Psrl}=\text{Psrr}=\text{Pmr} \tag{8}$$

Where Pmf is a braking fluid pressure for the front wheels. Moreover, Pmr is a braking fluid pressure for the rear wheels and is calculated based on braking fluid pressure Pmf for the front wheels in consideration of a distribution between the front and rear. For example, when the driver is operating the brake (pedal), braking fluid pressures Pmf and Pmr take values according to the operation degree (master cylinder fluid pressure Pm) of this brake operation.

On the other hand, in the case where departure judgment flag $F_{out}$ is ON, namely in the case where absolute value $|M_S|$ of target yaw moment $M_S$ is greater than 0 (in the case where the determination result that there is the lane departure tendency is produced); a front-wheel target braking-fluid-pressure differential $\Delta$Psf and a rear-wheel target braking-fluid-pressure differential $\Delta$Psr are calculated on the basis of target yaw moment $M_S$ set at step S8. Specifically, target braking-fluid-pressure differentials $\Delta$Psf and $\Delta$Psr are calculated from the following Equations (9) and (10).

$$\Delta Psf = 2 \cdot Kbf \cdot (M_S \cdot FR_{ratio})/T \tag{9}$$

$$\Delta Psr = 2 \cdot Kbr \cdot (M_S \cdot (1 - FR_{ratio}))/T \tag{10}$$

Where $FR_{ratio}$ denotes a threshold value for setting, and T denotes a tread. Note that this tread T is prescribed to take an equal value in the front and rear ends for convenience sake. Moreover, Kbf and Kbr are conversion factors respectively related to front wheels and the rear wheels which are used for converting the braking force (power) to the braking fluid pressure. Kbf and Kbr are determined from a brake specification. These target braking-fluid-pressure differentials $\Delta$Psf and $\Delta$Psr are values for determining the distribution (ratio) of braking force for being applied to respective wheels in accordance with the magnitude of target yaw moment $M_S$. In other words, each of these target braking-fluid-pressure differentials $\Delta$Psf and $\Delta$Psr is a value for generating the difference of braking force between left wheel and right wheel in the corresponding front or rear end.

Then, target braking fluid pressures Psi (i=fl, fr, rl, rr) for respective wheels are calculated finally by using the calculated target braking-fluid-pressure differentials $\Delta$Psf and $\Delta$Psr. Specifically, in the case where departure judgment flag $F_{out}$ is ON and departure direction $D_{out}$ is LEFT, namely in the case where there is the lane departure tendency relative to the white line located on the left side of lane; target braking fluid pressure Psi (i=fl, fr, rl, rr) for each wheel is calculated from the following Equations (11).

$$Psfl=Pmf$$

$$Psfr=Pmf+\Delta Psf$$

$$Psrl=Pmr$$

$$Psrr=Pmr+\Delta Psr \quad (11)$$

In the case where departure judgment flag $F_{out}$ is ON and departure direction $D_{out}$ is RIGHT, namely in the case where there is the lane departure tendency relative to the white line located on the right side of lane; target braking fluid pressure Psi (i=fl, fr, rl, rr) for each wheel is calculated from the following Equations (12).

$$Psfl=Pmf+\Delta Psf$$

$$Psfr=Pmf$$

$$Psrl=Pmr+\Delta Psr$$

$$Psrr=Pmr \quad (12)$$

According to Equations (11) and (12), the difference of braking force between the left and right wheels is generated so as to allow the braking force of the wheel located in a direction to avoid the lane departure, to become greater. Moreover as shown in Equations (11) and (12), target braking fluid pressure Psi (i=fl, fr, rl, rr) for each wheel is calculated in consideration of the driver's brake operation namely in consideration of braking fluid pressures Pmf and Pmr. Then, braking/driving force control unit 8 outputs thus-calculated target braking fluid pressure Psi (i=fl, fr, rl, rr) for each wheel to braking-fluid-pressure control section 7, as the braking-fluid-pressure command value.

(Operations)

The operations according to the first embodiment will now be explained below. While the vehicle is running (traveling), the controller (control unit 8) reads various data (step S1) and calculates vehicle speed V and the yaw angle (steps S2 and S3). Subsequently, the controller calculates estimated lateral displacement (estimated value of departure) $X_S$ (step S4), carries out the judgment of lane departure tendency (setting of departure judgment flag $F_{out}$) on the basis of estimated lateral displacement $X_S$, and corrects the judgment result (departure judgment flag $F_{out}$) of lane departure tendency on the basis of driver's intention of changing lanes (step S6).

On the other hand, the controller calculates basic yaw moment $M_S0$ (step S5), and calculates target yaw moment $M_S$ by processing the calculated basic yaw moment $M_S0$ with the limiters (step S8). Moreover, the controller corrects output-finish determining threshold value $X_{end}$ (step S7) for judging the finish timing of output of yaw moment, on the basis of estimated departure expanding degree $EX_{depart}$ according to yaw angle $\phi_{depart}$ (step S9). Namely, the output finish timing of yaw moment is corrected.

Then, the controller carries out the warning output (e.g., alarm) in dependence upon the judgment result of lane departure tendency (step S10), calculates target braking fluid pressure Psi (i=fl, fr, rl, rr) for each wheel on the basis of target yaw moment $M_S$, and outputs the calculated target braking fluid pressure Psi (i=fl, fr, rl, rr) for each wheel to braking-fluid-pressure control section 7 (step S11). Thereby, the yaw moment according to (the condition of) the lane departure tendency of vehicle is applied to the vehicle. Then, at the output finish timing of yaw moment ($|X_{front}| \geq X_{end}$), the controller stops applying (outputting) yaw moment to the vehicle so that the lane departure prevention control is terminated.

(Functions and Effects)

Next, functions and effects according to the first embodiment will now be explained below.

①The lane departure prevention control in the case where the control range is not corrected (in the case where gain $K_{wlimt}$ is equal to 1, namely in the case where estimated departure expanding degree $EX_{depart}$ or yaw angle $\phi_{depart}$ is small).

FIG. 12A shows the control range of lane departure prevention control in this case. Further, FIG. 12B shows a control time period (control duration time, or control execution time) $T_{con}1$ of lane departure prevention control. Further, FIG. 12C shows the variation of target yaw moment $M_S$ during the lane departure prevention control.

As shown in FIG. 12A, the lane departure prevention control is started when ($X_S$ or $X_{front}$ of) vehicle 101 exceeds "A" point (departure-tendency determining threshold value $X_L$), and then is finished when ($X_S$ or $X_{front}$ of) vehicle 101 reaches "B" point (output-finish determining threshold value $X_{end}$). Namely, the lane departure prevention control is performed by regarding a range between "A" point and "B" point as control range $I_{S\_W\_}LMT$. Thus as shown in FIG. 12B, control time period $T_{con}1$ of lane departure prevention control becomes a value corresponding to control range $I_{S\_W\_}LMT$. Hence as shown by a hatching area of FIG. 12C, the predetermined amount of yaw moment $M_S$ corresponding to this control range $I_{S\_W\_}LMT$ or control time period $T_{con}1$ is applied to vehicle 101.

②The lane departure prevention control in the case where the control range is corrected (in the case where gain $K_{wlimt}$ greater than 1, namely, in the case where estimated departure expanding degree $EX_{depart}$ or yaw angle $\phi_{depart}$ is large).

Figure 13A:
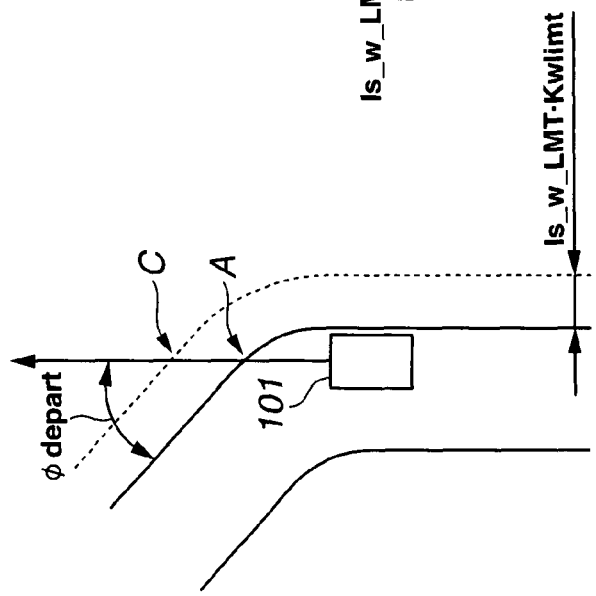
FIG. 13A is a view showing a control range of lane departure prevention control in the case where the control range of lane departure prevention control is corrected.
Figure 13B:
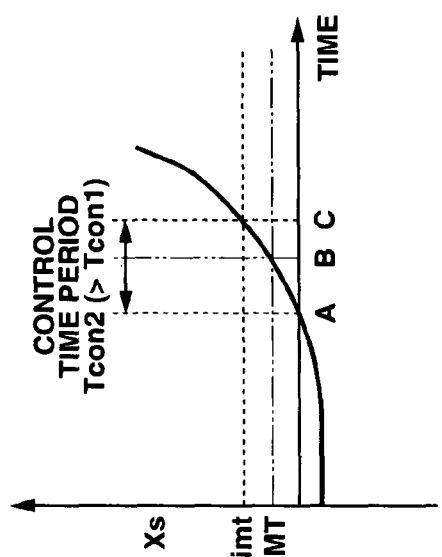
FIG. 13B is a view showing a control time period $T_{con}2$ of lane departure prevention control.
Figure 13C:
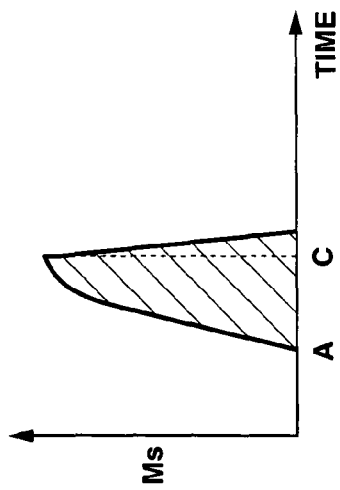
FIG. 13C is a view showing a variation of target yaw moment $M_S$ during the lane departure prevention control.

FIG. 13A shows the control range of lane departure prevention control in this case. Further, FIG. 13B shows a control time period $T_{con}2$ of lane departure prevention control. Further, FIG. 13C shows the variation of target yaw moment $M_S$ during the lane departure prevention control.

As shown in FIG. 13A, the lane departure prevention control is started when ($X_S$ or $X_{front}$ of) vehicle 101 exceeds "A" point (departure-tendency determining threshold value $X_L$), and then is finished when ($X_S$ or $X_{front}$ of) vehicle 101 reaches "C" point (actually corrected output-finish determining threshold value $X_{end}$). Namely, the lane departure prevention control is performed by regarding a range between "A" point and "C" point as a control range $K_{wlimt} \cdot I_{S\_W\_}LMT$ (where, $K_{wlimt}>1$). Thus as shown in FIG. 13B, control time period $T_{con}2$ of lane departure prevention control becomes a value corresponding to the corrected control range $K_{wlimt} \cdot I_{S\_W\_}LMT$. Namely, control time period $T_{con}2$ is longer than control time period $T_{con}1$ of the case where estimated departure expanding degree $EX_{depart}$ (yaw angle $\phi_{depart}$) is small ($T_{con}2>T_{con}1$). Hence as shown by a hatching area of FIG. 13C, a predetermined amount of yaw moment $M_S$ corresponding to this control range $K_{wlimt} \cdot I_{S\_W\_}LMT$ or control time period $T_{con}2$ is applied to vehicle 101. As recognized from the comparison between FIG. 12C and FIG. 13C, the total amount of moment $M_S$ in this case (hatching area of FIG. 13C) is greater than the total amount of moment $M_S$ in the case where estimated departure expanding degree $EX_{depart}$ (yaw angle $\phi_{depart}$) is small (hatching area of FIG. 12C).

Note that the time point ("B" point of FIGS. 12A to 12C or "C" point of FIGS. 13A to 13C) when the control time period of lane departure prevention control has just elapsed may be regarded as the output finish point (timing) of yaw moment. However, the time point when the yaw moment applied to the vehicle as the lane departure prevention control becomes equal to 0 may be regarded as the output finish point (timing) of yaw moment. Namely, the point when the yaw moment applied to the vehicle as the lane departure prevention control becomes equal to 0 may be considered as an actual time point indicating that the control period of lane departure prevention control has elapsed.

As mentioned above, the control range (lateral range relative to the lane) of lane departure prevention control is enlarged, by more enlarging output-finish determining threshold value $X_{end}$ corresponding to the lateral position relative to traveling lane as yaw angle $\phi_{depart}$ obtained at the time of start of lane departure (tendency) or at the time of start of lane departure prevention control becomes greater. Accordingly, the control time period (control duration time) of lane departure prevention control is elongated, namely the finish timing for outputting the yaw moment is delayed so that the total amount of yaw moment for lane departure prevention control (control quantity or controlled variable) is increased. Even in the case where the lane departure prevention control is carried out under the situation where the yaw angle of vehicle becomes large relative to the traveling lane, for example, when the vehicle is running at an entrance (beginning) of curve; it can be suppressed that the time period during which a vehicle passenger perceives a control feeling over this lane departure prevention control comes to be short. Namely, the above-mentioned configuration in this embodiment can fit the lane departure prevention control to the control feeling of passenger.

It is noted that the lane departure prevention control apparatus according to the first embodiment can be modified to have the following configurations. In the first embodiment, estimated departure expanding degree $EX_{depart}$ is set based on yaw angle $\phi_{depart}$ (step S9). Contrary to this, estimated departure expanding degree $EX_{depart}$ can be set also based on a lateral speed $X_V$ or a lateral acceleration Xg of the vehicle relative to the lane (especially, lateral speed or lateral acceleration at the time of start of lane departure (tendency) or at the time of start of lane departure prevention control). Here, lateral speed $X_V$ is obtained, for example, by differentiating estimated lateral displacement $X_S$ or actual lateral displacement $X_{front}$.

Figure 14:
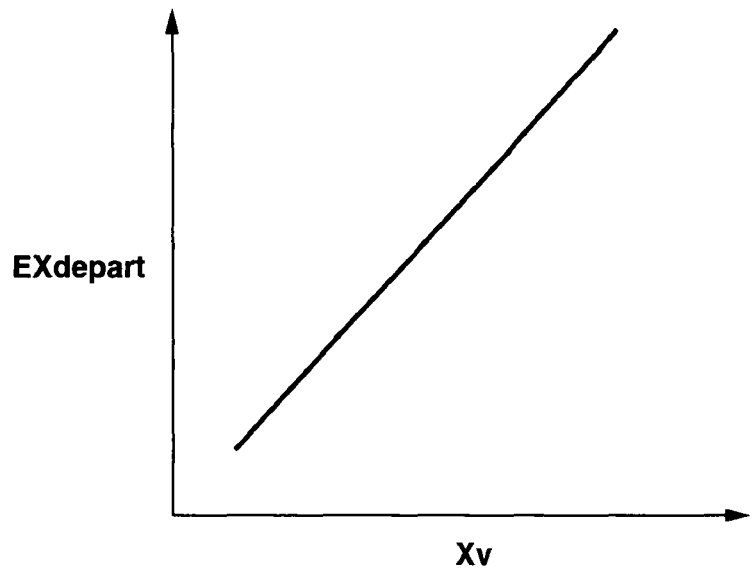
FIG. 14 is a characteristic view showing the relation between a lateral speed $X_V$ and estimated departure expanding degree $EX_{depart}$.

FIG. 14 is one example of the relation between lateral speed $X_V$ and estimated departure expanding degree $EX_{depart}$. As shown in FIG. 14, lateral speed $X_V$ and estimated departure expanding degree $EX_{depart}$ form a proportional relation. Referring to such characteristic view, estimated departure expanding degree $EX_{depart}$ is set on the basis of lateral speed $X_V$.

Moreover in the above-mentioned configuration, estimated departure expanding degree $EX_{depart}$ is calculated on the basis of yaw angle $\phi_{depart}$, lateral speed $X_V$, or the like obtained at the time of start of lane departure (tendency) or lane departure prevention control. However, estimated departure expanding degree $EX_{depart}$ can also be updated on the basis of yaw angle $\phi_{depart}$, lateral speed $X_V$, or the like obtainable after the start time of lane departure (tendency) or during the lane departure prevention control. For example, after the start time of lane departure (tendency) or during the lane departure prevention control; estimated departure expanding degree $EX_{depart}$ may be continuously updated by way of feedback processing on the basis of the value of yaw angle $\phi_{depart}$, lateral speed $X_V$, or the like, by detecting the momentarily varying yaw angle $\phi_{depart}$, lateral speed $X_V$, or the like. Thereby, the output finish timing of moment may be corrected based on estimated departure expanding degree $EX_{depart}$ which is newly updated during the lane departure prevention control or after the start of lane departure (tendency). Moreover, by detecting a maximum value of estimated departure expanding degree $EX_{depart}$ during the lane departure prevention control or after the start of lane departure (tendency), the output finish timing for yaw moment can also be corrected by means of the detected maximum value of estimated departure expanding degree $EX_{depart}$.

Moreover, as another way for correcting the predetermined finish parameter (or condition) of lane departure prevention control, a target yaw angle (finish yaw angle) which is set when the lane departure prevention control finishes can be corrected. For example, in the case where the target yaw angle at the normal finish timing of lane departure prevention control has been already set at 0°, the target yaw angle is corrected to an angle more inclined toward the inner side of traveling lane as estimated departure expanding degree $EX_{depart}$ becomes greater.

According to the above-described explanations about the first embodiment, the computing process shown by FIG. 2 that is executed in braking/driving force control unit 8 roughly achieves a control section (or means) configured to carry out the lane departure prevention control to prevent the vehicle from departing from the lane, and configured to finish the lane departure prevention control by using the predetermined finish parameter. Further, the processing of steps S1, S9, and S22 that are executed in braking/driving force control unit 8 roughly achieves a vehicle-state detecting section (or means) configured to detect the state of vehicle at least when or after the lane departure prevention control is started, and a departure-tendency-expanding-degree estimating section (or means) configured to estimate the expanding degree of departure tendency of the vehicle relative to the lane on the basis of the vehicle state detected by the vehicle-state detecting section. Further, the processing of steps S9 and S23 that are executed in braking/driving force control unit 8 roughly achieves a control finish-parameter correcting section configured to correct the predetermined finish parameter on the basis of the expanding degree of departure tendency (the vehicle state) estimated by the departure-tendency-expanding-degree estimating section.

According to the above-described explanations about the first embodiment, the structure making output-finish determining threshold value $X_{end}$ greater as estimated departure expanding degree $Ex_{depart}$ becomes greater achieves a structure that the control finish-parameter correcting section brings the predetermined finish parameter more difficult to be satisfied as the expanding degree of departure tendency estimated by the departure-tendency-expanding-degree estimating section becomes greater, a structure that the control finish-parameter correcting section corrects the finish timing of lane departure prevention control (which is the predetermined finish parameter), and a structure that the control finish-parameter correcting section corrects the lateral control-finish position for lane departure prevention control (which is the predetermined finish parameter) relative to the lane.

In the lane departure prevention apparatus according to the first embodiment, it is achieved that the lane departure prevention control is terminated in accordance with the expanding degree of departure tendency of vehicle against the (center of) traveling lane after the start of lane departure prevention control.

Second Embodiment

Next, a second embodiment according to the present invention will be explained below.
(Structures)
In the second embodiment, a rear-wheel drive vehicle equipped with the lane departure prevention apparatus according to the present invention is exemplified in the similar manner as the first embodiment. In the second embodiment, a procedure of computing process that is executed in braking/driving force control unit 8 is same as the procedure shown in FIG. 2, namely similar as the procedure in the first embodiment. However, the correction of output finish timing for yaw moment at step S9 is different from that of the first embodiment. Namely, at step S9 in the second embodiment, the output finish timing for yaw moment is corrected by correcting decrease-side variation limiter $L_{down}$ set at step S8.

Figure 15:
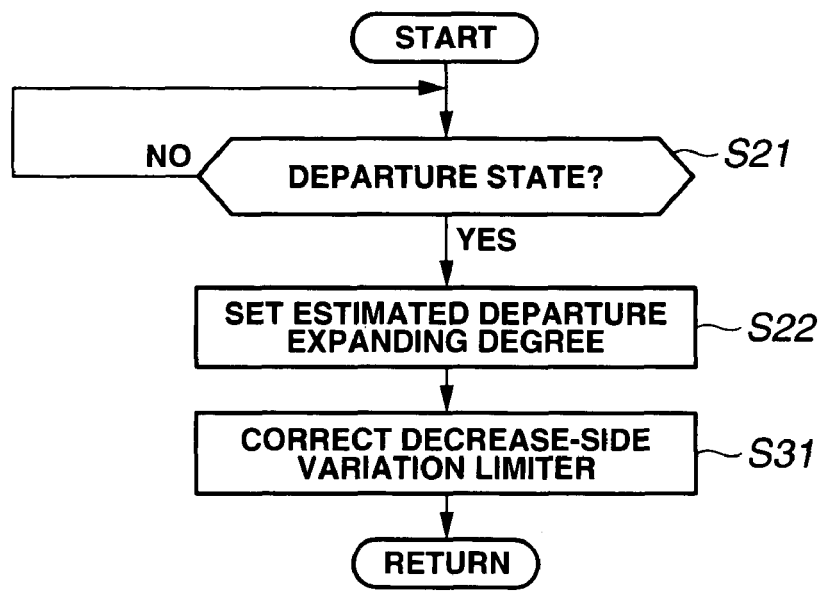
FIG. 15 is a flowchart showing processing contents for a correction of output finish timing of yaw moment that are executed by the control unit, in a second embodiment according to the present invention.

FIG. 15 shows a procedure for correcting the output finish timing of yaw moment in the second embodiment. As shown in FIG. 15, the controller judges whether or not the vehicle is in the state of lane departure (tendency) at step S21. Namely, the controller judges whether or not the vehicle has started (or has been predicted) to depart from the lane in the similar manner as the first embodiment. Subsequently at step S22, the controller sets estimated departure expanding degree $EX_{depart}$. Subsequently at step S31, in the second embodiment, the controller corrects decrease-side variation limiter $L_{down}$ on the basis of estimated departure expanding degree $EX_{depart}$ set at step S22. Specifically, decrease-side variation limiter $L_{down}$ is corrected based on a gain $K_{ldown}$ by obtaining gain $K_{ldown}$ according to estimated departure expanding degree $EX_{depart}$.

Figure 16:
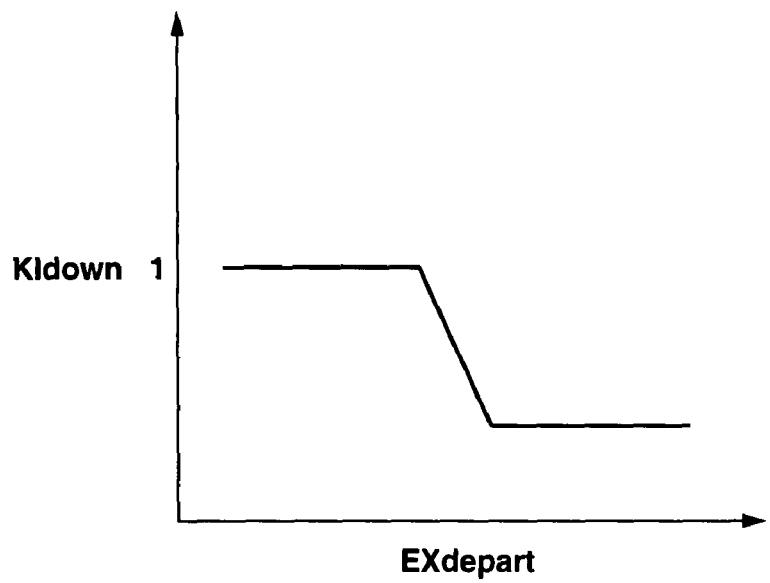
FIG. 16 is a characteristic view showing the relation between a gain $K_{ldown}$ and estimated departure expanding degree $EX_{depart}$.

FIG. 16 is one example of the relation between gain $K_{ldown}$ and estimated departure expanding degree $EX_{depart}$. As shown in FIG. 16, gain $K_{ldown}$ is a constant great value ($K_{ldown}=1$) in a small region of estimated departure expanding degree $EX_{depart}$. Then, gain $K_{ldown}$ decreases in response to the increase of estimated departure expanding degree $EX_{depart}$ after estimated departure expanding degree $EX_{depart}$ has reached a certain value. Then, gain $K_{ldown}$ becomes a small constant value when estimated departure expanding degree $EX_{depart}$ reaches the other certain value. Referring to such characteristic view, gain $K_{ldown}$ is set on the basis of estimated departure expanding degree $EX_{depart}$.

Next, the controller corrects decrease-side variation limiter $L_{down}$ on the basis of the set gain $K_{ldown}$, with reference to the following Equation (13).

$$L_{down} = K_{ldown} \cdot L_{down} \qquad (13)$$

Thus, decrease-side variation limiter $L_{down}$ is corrected and decreased when gain $K_{ldown}$ is small. Accordingly, decrease-side variation limiter $L_{down}$ becomes smaller (i.e., more gentle) as estimated departure expanding degree $EX_{depart}$ becomes greater, in other words, as yaw angle $\phi_{depart}$ at the start time of lane departure (tendency) becomes greater. Thus in the second embodiment, the output finish timing for yaw moment is corrected by correcting decrease-side variation limiter $L_{down}$ so as to reduce decrease-side variation limiter $L_{down}$.

Figure 17:
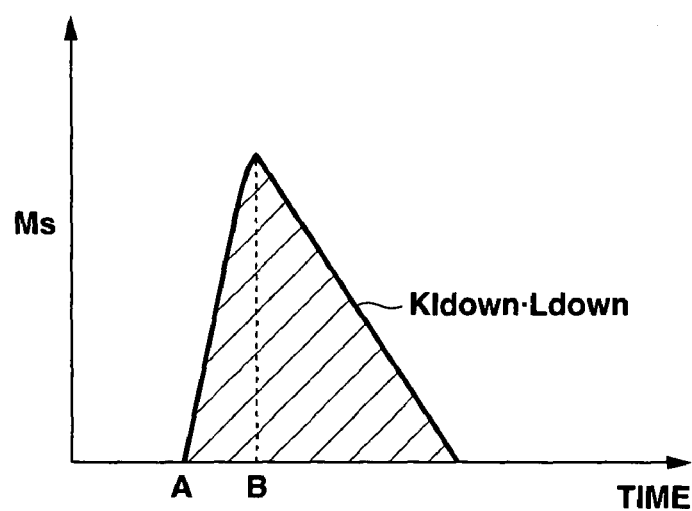
FIG. 17 is a characteristic view showing a variation of target yaw moment $M_S$ in the lane departure prevention control, in the case where the output finish timing of yaw moment is corrected in the second embodiment.

FIG. 17 shows a variation of target yaw moment $M_S$ for the lane departure prevention control in the case where the output finish timing of yaw moment is corrected by correcting decrease-side variation limiter $L_{down}$ to its reduced side (in the case where estimated departure expanding degree $EX_{depart}$ or yaw angle $\phi_{depart}$ is relatively great). Since control range $I_{S\_W\_}LMT$ is not corrected in the second embodiment; the control range of lane departure prevention control is as shown by FIG. 12A, and the control time period (duration time) of lane departure prevention control is as shown by FIG. 12B. However, target yaw moment $M_S$ for lane departure prevention control in the second embodiment (FIG. 17) is different from that shown by FIG. 12C.

Namely, the gradient (i.e., decrease rate) of target yaw moment $M_S$ in its decreasing side in the second embodiment becomes gentle (i.e., low) as compared with the gradient of target yaw moment $M_S$ in its decreasing side shown in FIG. 12C, since decrease-side variation limiter $L_{down}$ is decreasingly corrected. Thereby, the output finish timing of yaw moment is delayed, namely a time period that elapses before target yaw moment $M_S$ becomes equal to 0 is elongated.

As mentioned above, decrease-side variation limiter $L_{down}$ is made smaller (gentle), as yaw angle $\phi_{depart}$ at the time of start of lane departure (tendency) or at the time of start of lane departure prevention control becomes greater. Hence, an actual control time period of lane departure prevention control is elongated, and the total amount of yaw moment (control quantity) for lane departure prevention control is increased. Accordingly, even in the case where the lane departure prevention control is carried out under the situation where the yaw angle of vehicle becomes large relative to the (center line of) lane, for example, when the vehicle is running at an entrance (beginning) of curve; it can be suppressed that the time period during which a vehicle passenger perceives a control feeling over this lane departure prevention control comes to be short. Namely, the above-mentioned configuration in this embodiment can fit the lane departure prevention control to the control feeling of passenger.

It is noted that the lane departure prevention control apparatus according to the second embodiment can be modified to have the following configurations. Namely, since the lane departure prevention control apparatus according to the second embodiment is based on the premise that decrease-side variation limiter $L_{down}$ is corrected, target yaw moment $M_S$ may be calculated by using only the decrease-side variation limiter $L_{down}$ in the limit processing conducted at step S8. Namely, only (or, at least) the decrease-side variation limiter $L_{down}$ may be set as prescribed values.

According to the above-described explanations about the second embodiment, the structure making decrease-side variation limiter $L_{down}$ smaller as estimated departure expanding degree $Ex_{depart}$ becomes greater achieves a structure that the control finish-parameter correcting section (or means) corrects the decrease rate of control quantity (which is the predetermined finish parameter), in the case where the control section (or means) continuously varies the control quantity of lane departure prevention control during the lane departure prevention control and decreases the control quantity when finishing the lane departure prevention control.

Third Embodiment

Next, a third embodiment according to the present invention will be explained below.
(Structures)
In the third embodiment, a rear-wheel drive vehicle equipped with the lane departure prevention apparatus according to the present invention is exemplified in the similar manner as the first embodiment. In the third embodiment, a procedure of computing process that is executed in braking/driving force control unit 8 is same as the procedure shown in FIG. 2, namely similar as the procedure in the first embodiment. However, the correction of output finish timing for yaw moment at step S9 is different from that of the first embodiment. Namely, at step S9 in the third embodiment, the output finish timing for yaw moment is corrected by maintaining or holding basic yaw moment $M_S 0$ obtained at the time of finish of lane departure prevention control, for a predetermined time period.

Figure 18:
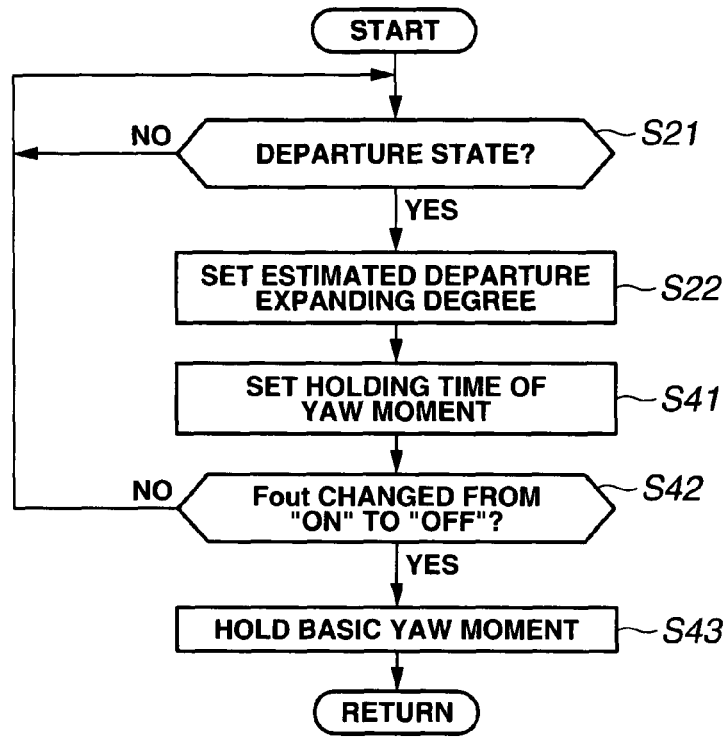
FIG. 18 is a flowchart showing processing contents for a correction of output finish timing of yaw moment that are executed by the control unit, in a third embodiment according to the present invention.

FIG. 18 shows a procedure for correcting the output finish timing of yaw moment in the third embodiment. As shown in FIG. 18, the controller judges whether or not the vehicle is in the state of lane departure (tendency) at step S21. Namely, the controller judges whether or not the vehicle has started (or has been predicted) to depart from the lane in the similar manner as the first embodiment. Subsequently at step S22, the controller sets estimated departure expanding degree $EX_{depart}$. Subsequently at step S41, in the third embodiment, the controller sets a holding time (retention time period) for the yaw moment of lane departure prevention control (specifically, basic yaw moment $M_S 0$) which is obtained at the finish time of lane departure prevention control, on the basis of estimated departure expanding degree $EX_{depart}$ set at step S22.

Figure 19:
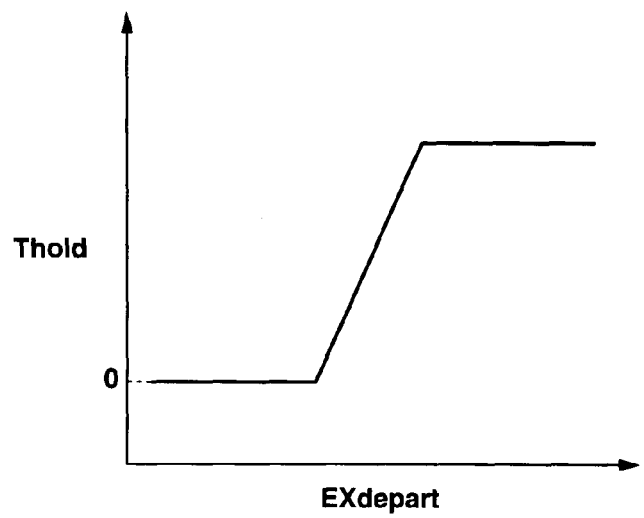
FIG. 19 is a characteristic view showing the relation between a holding time $T_{hold}$ and estimated departure expanding degree $EX_{depart}$.

FIG. 19 is one example of the relation between holding time $T_{hold}$ and estimated departure expanding degree $EX_{depart}$. As shown in FIG. 19, holding time $T_{hold}$ is equal to 0 in a small region of estimated departure expanding degree $EX_{depart}$. Then, holding time $T_{hold}$ increases in response to the increase of estimated departure expanding degree $EX_{depart}$ after estimated departure expanding degree $EX_{depart}$ has reached a certain value. Then, holding time $T_{hold}$ becomes a great constant value when estimated departure expanding degree $EX_{depart}$ reaches the other certain value. Referring to such characteristic view, holding time $T_{hold}$ is set on the basis of estimated departure expanding degree $EX_{depart}$.

Subsequently at step S42, the controller judges whether or not departure judgment flag $F_{out}$ has changed from ON to OFF. If it is determined that departure judgment flag $F_{out}$ has changed from ON to OFF, namely if the finish timing of lane departure prevention control has come; the program proceeds to step S43. If not, namely if it is determined that departure judgment flag $F_{out}$ is being maintained at ON; the program returns to step S21.

At step S43, the controller determines that basic yaw moment $M_S 0$ calculated at step S5 is held (i.e., previous value of basic yaw moment $M_S 0$ is retained) for holding time $T_{hold}$ set at step S41. Thereby, basic yaw moment $M_S 0$ at the time point when departure judgment flag $F_{out}$ changes from ON to OFF is held for the whole length of holding time $T_{hold}$. Then, the yaw moment based on basic yaw moment $M_S 0$ which is being held is applied to the vehicle as the lane departure prevention control.

Figure 20:
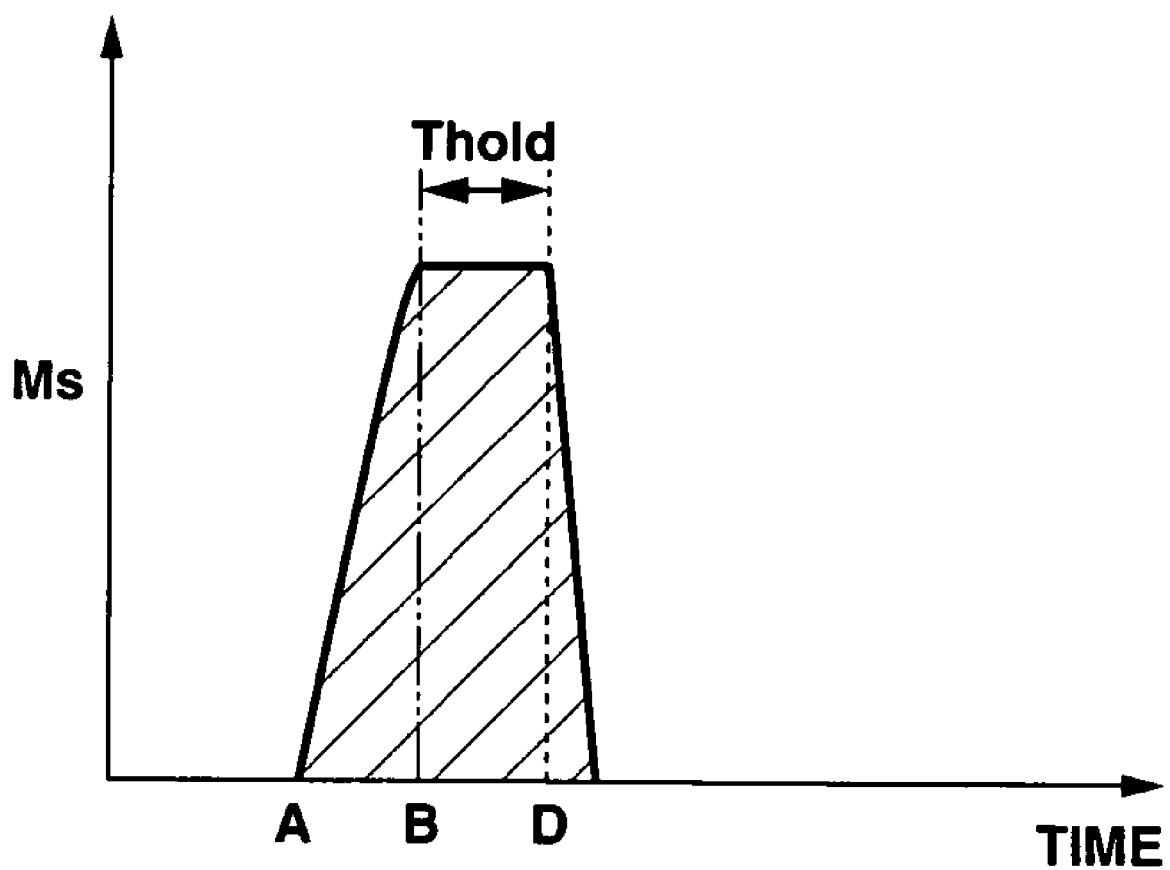
FIG. 20 is a characteristic view showing a variation of target yaw moment $M_S$ in the lane departure prevention control, in the case where the output finish timing of yaw moment is corrected in the third embodiment.

Thus in the third embodiment, basic yaw moment $M_S 0$ at the time point of the change of departure judgment flag $F_{out}$ from ON to OFF is held for holding time $T_{hold}$ as it is, without reducing the basic yaw moment $M_S 0$. Then, the yaw moment based on basic yaw moment $M_S 0$ which is being held is applied to the vehicle. FIG. 20 shows a variation of target yaw moment $M_S$ in this case. Since control range $I_{S\_W}\_LMT$ is not corrected in the third embodiment; the control range of lane departure prevention control is as shown by FIG. 12A, and the control time period (duration time) of lane departure prevention control is as shown by FIG. 12B. However, target yaw moment $M_S$ for lane departure prevention control in the third embodiment (FIG. 20) is different from that shown by FIG. 12C.

Namely, by holding basic yaw moment $M_S 0$ for holding time $T_{hold}$ from the time point when departure judgment flag $F_{out}$ changes from ON to OFF; the output time period (output duration) of target yaw moment $M_S$ is elongated according to holding time $T_{hold}$ as compared with the target yaw moment $M_S$ shown by FIG. 12C.

As mentioned above, holding time $T_{hold}$ is made longer as yaw angle $\phi_{depart}$ obtained at the time of start of lane departure (tendency) or at the time of start of lane departure prevention control becomes greater. Accordingly, the actual control time period (control duration time) of lane departure prevention control is elongated so that the total amount of yaw moment for lane departure prevention control (control quantity) is increased. Therefore, even in the case where the lane departure prevention control is carried out under the situation where the yaw angle of vehicle becomes large relative to the traveling lane, for example, when the vehicle is running at an entrance (beginning) of curve; it can be suppressed that the time period during which a vehicle passenger perceives a control feeling over this lane departure prevention control comes to be short. Namely, the above-mentioned configuration in this embodiment can fit the lane departure prevention control to the control feeling of passenger.

It is noted that the lane departure prevention control apparatus according to the third embodiment can be modified to have the following configurations. Namely in the third embodiment, the total amount of yaw moment is corrected by elongating the holding time $T_{hold}$. Contrary to this, a total amount of braking force or brake fluid pressure for applying the yaw moment can also be corrected. Namely, the holding time may be determined by focusing on the braking force or brake fluid pressure instead of the yaw moment.

According to the above-described explanations about the third embodiment, the structure making holding time $T_{hold}$ longer as estimated departure expanding degree $Ex_{depart}$ becomes greater achieves a structure that the control finish-parameter correcting section (or means) corrects the control holding time (which is the predetermined finish parameter) for keeping the control quantity of the finish time of lane departure prevention control, in the case where the control section (or means) continuously varies the control quantity of lane departure prevention control during the lane departure prevention control.

Fourth Embodiment

Next, a fourth embodiment according to the present invention will be explained below.

(Structures)

In the fourth embodiment, a rear-wheel drive vehicle equipped with the lane departure prevention apparatus according to the present invention is exemplified in the similar manner as the first embodiment. In the fourth embodiment, the output finish timing for yaw moment (predetermined finish parameter) corrected based on yaw angle $\phi_{depart}$ or estimated departure expanding degree $EX_{depart}$ is further corrected based on a condition of driving operation by the driver.

Figure 21:
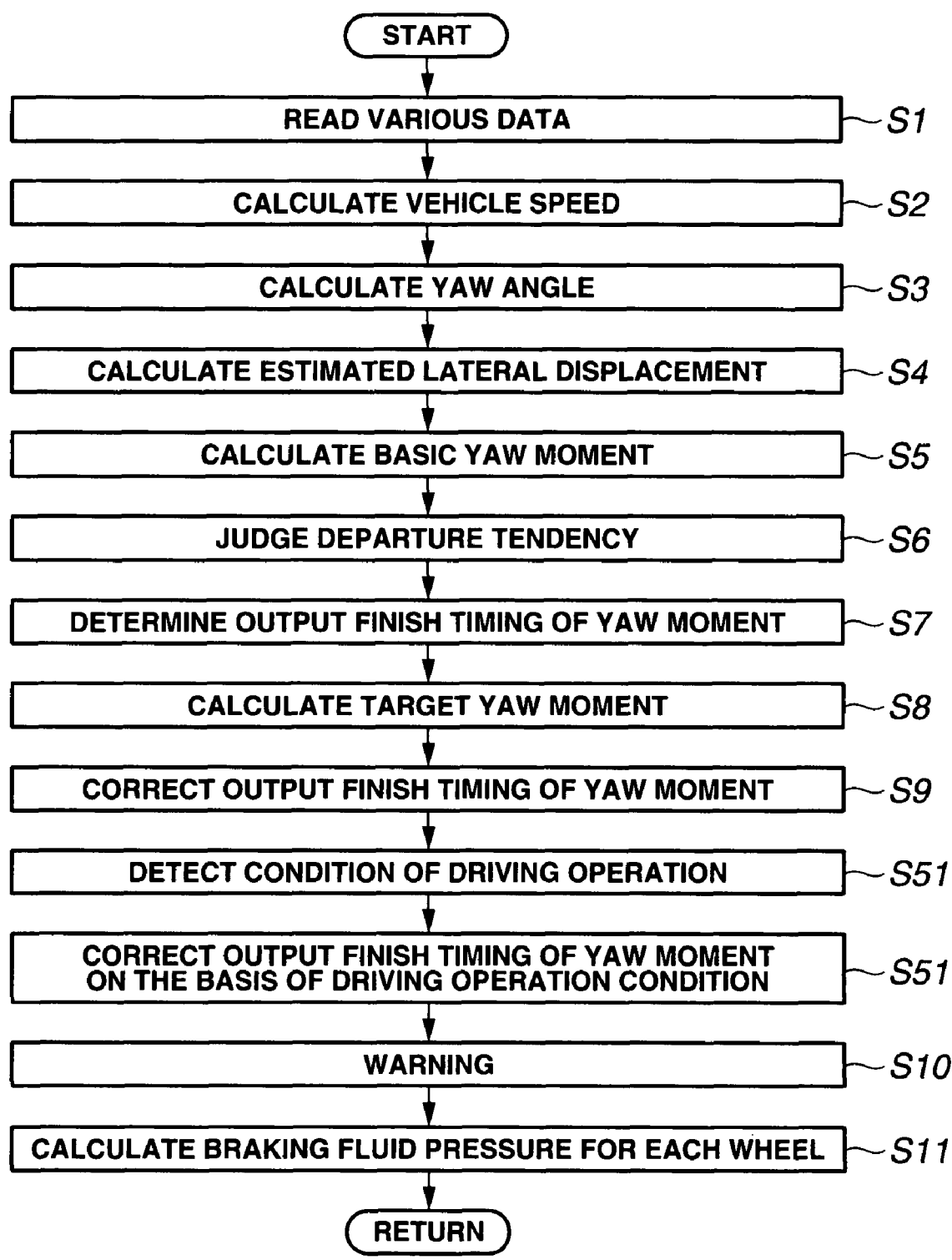
FIG. 21 is a flowchart showing processing contents that are executed by the control unit in a fourth embodiment according to the present invention.

FIG. 21 shows a computing process that is executed by braking/driving force control unit 8 in the fourth embodiment. A basic portion of the computing process shown in FIG. 21 that is executed in the fourth embodiment is same as the computing process shown in FIG. 2 that is executed by braking/driving force control unit 8 in the first embodiment. However, steps S51 and S52 are provided subsequent to step S9 in the computing process shown in FIG. 21 in the fourth embodiment. In the following explanations about the computing process shown in FIG. 21 in the fourth embodiment, respective steps having same reference marks as those of computing process shown in FIG. 2 are similar as the first embodiment unless those are particularly mentioned.

As shown in FIG. 21, the controller detects the condition of driving operation of vehicle at step S51. Specifically, the controller calculates a steering speed $\Delta_{str}$ on the basis of a variation of steering angle δ (sensed value of steering angle sensor 19 read out at step S1) per a predetermined time period $T_{str}1$ (for example 0.2 seconds), with reference to the following Equation (14). This variation is the difference between a current value (this-time-around value) $\delta_{now}$ of steering angle δ and a value $\delta_{tstr}$ obtained the predetermined time period before.

$$\Delta_{str}=|(\delta_{now}-\delta_{tstr})/T_{str}1| \quad (14)$$

Figure 22:
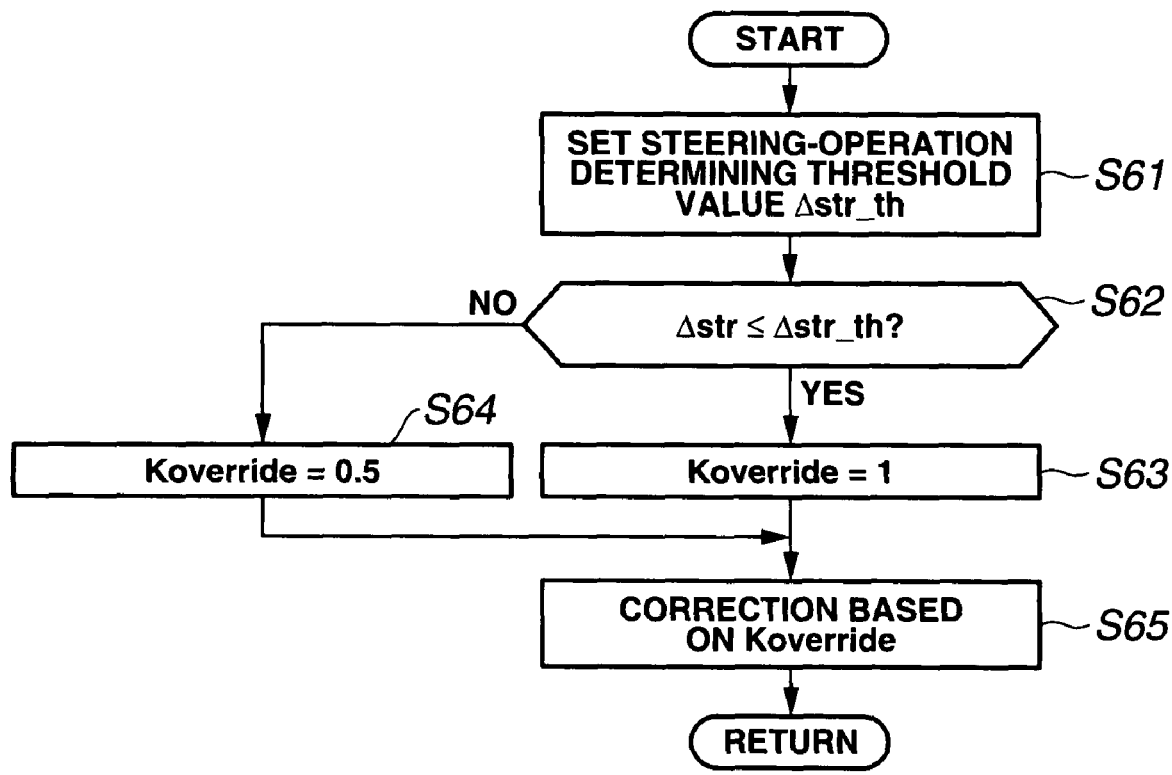
FIG. 22 is a flowchart showing processing contents for correcting the output finish timing of yaw moment on the basis of a condition of driving operation, that is executed by the control unit in the fourth embodiment.

Subsequently at step S52, the controller further corrects the output finish timing of yaw moment corrected at step S9, on the basis of the condition of driving operation. FIG. 22 shows a procedure of this further correction.

As shown in FIG. 22, at step S61, the controller sets a steering-operation determining threshold value $\Delta_{str\_th}$ for comparing with steering speed $\Delta_{str}$ calculated at step S51. Steering-operation determining threshold value $\Delta_{str\_th}$ is, for example, a value provided through experimental trials and experiences. This steering-operation determining threshold value $\Delta_{str\_th}$ is the value having a level from which it can be determined that the driver has operated the steering wheel. Subsequently at step S62, the controller compares steering speed $\Delta_{str}$ calculated at step S51 with steering-operation determining threshold value $\Delta_{str\_th}$. If steering speed $\Delta_{str}$ is lower than or equal to steering-operation determining threshold value $\Delta_{str\_th}$ ($\Delta_{str}\leq\Delta_{str\_th}$), the program proceeds to step S63. If not ($\Delta_{str}>\Delta_{str\_th}$), the program proceeds to step S64.

At step S63, the controller sets a correction gain $K_{override}$ at equal to 1. At step S64, the controller sets correction gain $K_{override}$ at a predetermined value lower than 1 (e.g., 0.5). Then, the program proceeds to step S65. Here, when steering speed $\Delta_{str}$ is higher than steering-operation determining threshold value $\Delta_{str\_th}$ ($\Delta_{str}>\Delta_{str\_th}$), correction gain $K_{override}$ is set to the predetermined value lower than 1 (steps S62 and S64). However, when steering speed $\Delta_{str}$ is higher than steering-operation determining threshold value $\Delta_{str\_th}$ ($\Delta_{str}>\Delta_{str\_th}$), correction gain $K_{override}$ can also be set at a value according to steering speed $\Delta_{str}$ or its difference ($\Delta_{str}-\Delta_{str\_th}$).

At step S65, the controller further collects the output finish timing of yaw moment corrected at step S9, on the basis of correction gain $K_{override}$. In the case where gain $K_{wlimt}$ for correcting the control range is calculated based on estimated departure expanding degree $EX_{depart}$, and the output finish timing of yaw moment is corrected by using the calculated gain $K_{wlimt}$ as the first embodiment; gain $K_{wlimt}$ is corrected by using correction gain $K_{override}$ as shown in the following Equation (15).

$$K_{wlimt}=K_{override}\cdot K_{wlimt} \quad (15)$$

Moreover, in the case where gain $K_{ldown}$ for correcting decrease-side variation limiter $L_{down}$ is calculated based on estimated departure expanding degree $EX_{depart}$, and the output finish timing of yaw moment is corrected by using the calculated gain $K_{ldown}$ as the second embodiment; gain $K_{ldown}$ is corrected by using correction gain $K_{override}$ as shown in the following Equation (16).

$$K_{ldown}=K_{override}\cdot K_{ldown} \quad (16)$$

In practice, gain $K_{ldown}$ is calculated by using an inverse of correction gain $K_{override}$ as shown in the following Equation (17), in consideration of the feature that the output finish timing of yaw moment becomes later (more delayed) as gain $K_{ldown}$ becomes smaller.

$$K_{ldown}=(1/K_{override})\cdot K_{ldown} \quad (17)$$

Moreover, in the case where holding time $T_{hold}$ is calculated based on estimated departure expanding degree $EX_{depart}$, and the output finish timing of yaw moment is corrected by using the calculated holding time $T_{hold}$ as the third embodiment; holding time $T_{hold}$ is corrected by using correction gain $K_{override}$ as shown in the following Equation (18).

$$T_{hold}=K_{override}\cdot T_{hold} \quad (18)$$

Thus in the fourth embodiment, the output finish timing of yaw moment corrected based on estimated departure expanding degree $EX_{depart}$ is further corrected based on steering angle δ indicating the driving operation condition of the driver. Specifically, when the steering speed is relatively high; gain $K_{wlimt}$ or holding time $T_{hold}$ is corrected to become smaller, or gain $K_{ldown}$ is corrected to become greater, by setting correction gain $K_{override}$ to become smaller. Thereby, the output finish timing of yaw moment corrected based on estimated departure expanding degree $EX_{depart}$ is re-corrected to become earlier. Accordingly, even in the case where the output finish timing of yaw moment has been corrected to become more delayed on the basis of estimated departure expanding degree $EX_{depart}$ at step S9; this corrected output finish timing of yaw moment is re-corrected to take an earlier value when the variation of steering angle δ is great (as compared to the threshold value), at steps S51 and S52. Namely, when the steering speed or variation of steering angle δ is relatively great, it is determined that the driver has the intention of driving operation (there is a high degree of driver's intention to manipulate the steering wheel). In other words, the correction of output finish timing of yaw moment which is conducted based on estimated departure expanding degree $EX_{depart}$ is suppressed. Thereby, it can be prevented that the lane departure prevention control becomes burdensome for the driver due to the elongation of lane departure prevention control in the case where the driver has the intention of driving operation.

It is noted that the lane departure prevention control apparatus according to the fourth embodiment can be modified to have the following configurations. At step S51, the steering speed ($\Delta_{str}2$) can be calculated also based on a steering variation within a longer time period $T_{str}2$ ($>T_{str}1$, for example 2 seconds) which can correspond to a slower steering operation (manipulation), as shown by the following Equation (19).

$$\Delta_{str}2=|(\delta_{now}-\delta_{tstr}2)/T_{str}2| \quad (19)$$

Where, $\delta_{tstr}2$ denotes a value of steering angle δ obtained time period $T_{str}2$ before.

Moreover in the fourth embodiment, the driver's intention of driving operation is judged by calculating steering speed Δstr on the basis of steering angle δ and then comparing the calculated steering speed $\Delta_{str}$ with steering-operation determining threshold value $\Delta_{str\_th}$. Contrary to this, a second steering-operation determining threshold value $\Delta_{str\_th}2$ can be provided in addition to steering-operation determining threshold value (hereinafter, called a first steering-operation determining threshold value) $\Delta_{str\_th}$. In this case, second steering-operation determining threshold value $\Delta_{str\_th}2$ is set to be greater than first steering-operation determining threshold value $\Delta_{str\_th}$ ($\Delta_{str\_th}2>\Delta_{str\_th}$). Then, when steering speed $\Delta_{str}$ is lower than or equal to second steering-operation determining threshold value $\Delta_{str\_th}2$ ($\Delta_{str}\leq\Delta str_{\_th}2$), correction gain $K_{override}$ may be set at equal to 1. When not ($\Delta_{str} > \Delta_{str\_th}2$), correction gain $K_{override}$ may be set at equal to or near 0.

Accordingly, the output finish timing of yaw moment corrected based on estimated departure expanding degree $EX_{depart}$ is re-corrected to its earlier side, by determining that the driver has very high degree of intention of driving operation in the case where the steering speed or variation of steering angle δ is considerably great. Namely, the correction of output finish timing of yaw moment which is conducted based on estimated departure expanding degree $EX_{depart}$ is suppressed more strongly. In certain instances, the correction of output finish timing of yaw moment based on estimated departure expanding degree $EX_{depart}$ may be canceled.

Moreover in the fourth embodiment, the driver's intention of driving operation can be judged based on a variation Δθ (e.g., operation speed of accelerator) of accelerator opening or a variation $\Delta_{Brk}$ (e.g., operation speed of brake) of brake operation. Namely, the condition of accelerator operation or brake (pedal) operation can be defined as a marker (parameter) for judging the driver's intention of driving operation. In this case, the condition of accelerator operation is detected by accelerator opening sensor 18, and the condition of brake operation is detected by a brake operation sensor.

In this case, for example, variation Δθ of accelerator opening is calculated from the following Equation (20), and variation $\Delta_{Brk}$ of brake operation is calculated from the following Equation (21).

$$\Delta\theta = |(\theta_{now} - \theta_{t\theta})/T\theta| \quad (20)$$

$$\Delta_{Brk} = |(Brk_{now} - Brk_{tbrk})/T_{Brk}| \quad (21)$$

Where, $\theta_{now}$ denotes a current value (this-time-around value) of accelerator opening θ, $\theta_{t\theta}$ denotes a value of accelerator opening θ obtained a predetermined time period Tθ before, $Brk_{now}$ denotes a current value (this-time-around value) of a brake operative position Brk, and $Brk_{tbrk}$ denotes a value of brake operative position Brk obtained a predetermined time period $T_{Brk}$ before.

Moreover in the fourth embodiment, a plurality of markers for judging the driver's intention of driving operation may be used. For example, by obtaining the above-mentioned $\Delta_{str}$, $\Delta_{str}2$, Δθ, and $\Delta_{Brk}$, a plurality of correction gains $K_{override}$ are obtained based on these respective judgment markers. Then, by selecting one among these plurality of correction gains $K_{override}$ (for example, by selecting the lowest one), the output finish timing of yaw moment can be further corrected by using the selected correction gain $K_{override}$. Thus by referring to the plurality of markers for judging the driver's intention of driving operation, an optimum output finish timing of yaw moment can be achieved.

According to the above-described explanations about the fourth embodiment; steering angle sensor 19, the brake operation sensor, and steps S1 and S51 roughly achieve a driver-intention detecting section (or means) configured to detect the driver's intention of driving operation on the basis of the condition of driving operation by the driver. Accordingly, the control finish-parameter correcting section (or means) suppresses the correction of the predetermined finish parameter in the case where the driver-intention detecting section detects the driver's intention of driving operation.

Fifth Embodiment

Next, a fifth embodiment according to the present invention will be explained below.

(Structures)

In the fifth embodiment, a rear-wheel drive vehicle equipped with the lane departure prevention apparatus according to the present invention is exemplified in the similar manner as the first embodiment. It is noted that, in the case where each detected data of running state of vehicle has a directional property of left or right, the right direction is defined as a positive direction in the fifth embodiment. Namely, yaw rate φ', lateral acceleration Xg, and yaw angle φ take positive values when the vehicle is turning (or departing) in the right direction. Lateral displacement X takes a positive value when the (center of) vehicle is displaced in the right direction from the center of traveling lane. Moreover, longitudinal acceleration Yg takes a positive value when the vehicle accelerates, and takes a negative value when the vehicle decelerates.

Figure 23:
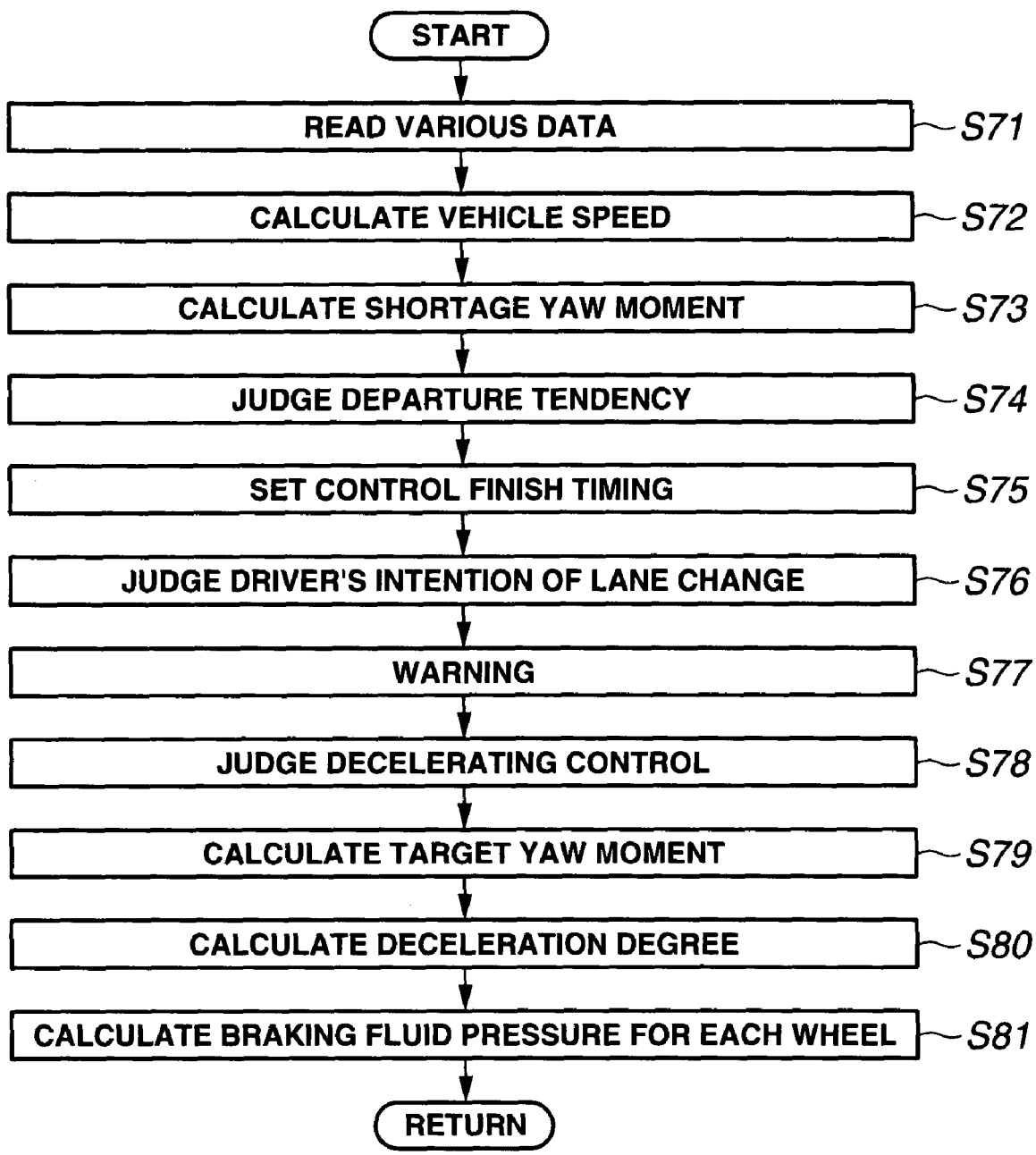
FIG. 23 is a flowchart showing processing contents that are executed by the control unit in a fifth embodiment according to the present invention.

FIG. 23 shows a computing process that is executed by braking/driving force control unit 8 in the fifth embodiment. This computing process is executed by means of a timer interruption every predetermined sampling period of time ΔT, for example, 10 milliseconds. Although a communication process is not specifically described in the computing process shown in FIG. 23, the information obtained through this computing process is updated and stored in the storage device on an as-needed basis and necessary information is read out from the storage device at any time on an as-needed basis.

As shown in FIG. 23, at step S71 of the computing process, various data are read out from the above-described respective sensors, controller, and control units. Specifically, braking/driving force control unit 8 reads a road-surface friction coefficient μ which is obtained by a road-surface-friction detection device 23; longitudinal acceleration Yg, lateral acceleration Xg, yaw rate φ', and the road information which are obtained by navigation device 14; respective wheel speeds Vwi, steering angle δ, accelerator opening θ, master cylinder fluid pressure Pm (Pmf and Pmr), and the signal of direction indicator switch which are detected by the respective sensors; drive torque $T_W$ which is derived from drive torque control unit 12; and yaw angle φ, lateral displacement $X_{front}$, and lane curvature β which are derived from image pickup section 13.

Subsequently at step S72, vehicle speed V is calculated. Specifically, vehicle speed V is calculated from the following Equations (22) on the basis of wheel speeds Vwi read out at step S71.

In the case of front-wheel drive, $V=(Vwrl+Vwrr)/2$

In the case of rear-wheel drive, $V=(Vwfl+Vwfr)/2$ \quad (22)

Here, Vwfl and Vwfr are the wheel speeds of respective left and right front wheels, and Vwrl and Vwrr are the wheel speeds of respective left and right rear wheels. Namely, vehicle speed V is calculated as an average value of the wheel speeds of driven wheels in these Equations (22). Since the rear-wheel drive vehicle is exemplified in this embodiment, vehicle speed V is calculated from the latter Equation, namely from the wheel speeds of front wheels.

Vehicle speed V calculated as described above is preferably used at the time of normal running. For example, when the ABS (Anti-lock Brake System) control is in operation, the vehicle-body speed estimated under the ABS control is used as the above-mentioned vehicle speed V. Moreover, a value related to vehicle speed which is used for navigation information in navigation device 14 may be used as the above-mentioned vehicle speed V. Then, the controller sets a previous vehicle speed $V_{PAST}$ at a value of vehicle speed V obtained in a previous computing process (last-time-around value of routine), as shown by the following Equation (23).

$$V_{PAST}=V \text{ (vehicle speed value at the time of previous routine)} \quad (23)$$

Subsequently at step S73, the controller calculates a shortage yaw moment (shortage control quantity or controlled variable). In the lane departure prevention control in this embodiment, when the vehicle tends to depart or deviate relative to the traveling lane (i.e., when there is a prediction that the vehicle departs from the traveling lane in near future), the vehicle is prevented from departing from the traveling lane by applying a predetermined yaw moment (predetermined control quantity for the lane departure avoidance) to the vehicle. Moreover, the lane departure prevention control according to this embodiment is based on the premise that the processing routine (processing routine of FIG. 23) for lane departure prevention control is carried out repeatedly until the completion of lane departure avoidance, namely, is based on the premise that the vehicle is prevented from departing from the lane by applying the yaw moment (concretely, target yaw moment $M_S$) to the vehicle continuously in sequence.

At this step S73, the shortage (shortage amount) of the yaw moment serving as the controlled variable for the above-mentioned lane departure prevention control is calculated or estimated. Specifically, a previously-calculated target yaw moment $M_S b$ is set at a value of target yaw moment $M_S$ (obtained at after-mentioned step S79) calculated in the previous computing process (e.g., last-time-around of routine), from the following Equation (24).

$$M_S b = M_S \quad (24)$$

Subsequently, the controller calculates a previous-process-generating actual yaw moment $M_S r$ on the basis of vehicle speed V. Namely, this actual yaw moment $M_S r$ is a value of yaw moment which is actually generated in the vehicle when target yaw moment $M_S$ calculated in the previous computing process (at last-time-around of routine) is applied to the vehicle as the lane departure prevention control.

For this calculation, at first, a decelerating degree (deceleration) $\Delta V$ is calculated by using previous vehicle speed $V_{PAST}$ calculated at step S72 and current vehicle speed V, from the following Equation (25).

$$\Delta V = (V - V_{PAST})/\Delta T \quad (25)$$

Where, $\Delta T$ denotes the process time period during which one routine of computing process of FIG. 23 is executed.

Subsequently, a decelerating degree (deceleration) $\Delta Vc$ caused by the lane departure prevention control is calculated by using decelerating degree $\Delta V$ calculated by Equation (25), from the following Equation (26).

$$\Delta Vc = \Delta V - \Delta Vd \quad (26)$$

Where, $\Delta Vd$ is a decelerating degree (deceleration) based on the accelerator operation or brake operation of the driver, vehicle specification, and a running resistance (travel resistance). $\Delta Vd$ can be obtained, for example, from a map related to a deceleration obtainable by the accelerator operation and brake operation. Moreover, $\Delta Vd$ can be calculated, for example, based on an engine rotational speed or the accelerator opening.

Then, the controller calculates actual yaw moment $M_S r$ by using lane-departure-prevention-control-part decelerating degree $\Delta Vc$ calculated by Equation (26), from the following Equation (27).

$$M_S r = A \cdot \Delta Vc \cdot T/2 \quad (27)$$

Where, A denotes a vehicle weight, and T denotes the tread length. Thus, actual yaw moment $M_S r$ generated by the previous computing process is calculated based on vehicle speed V.

Then, the shortage yaw moment (shortage of yaw moment) $\Delta M_S$ is calculated as the difference value between actual yaw moment $M_S r$ calculated by Equation (27) and previously-calculated target yaw moment $M_S b$ set by Equation (24), from the following Equation (28).

$$\Delta M_S = M_S b - M_S r \quad (28)$$

Subsequently at step S74, the controller judges the tendency of lane departure. Specifically, future estimated lateral displacement $X_S$ is calculated from the following Equation (29), by using yaw angle $\phi$ ($\phi_{front}$), traveling lane curvature $\beta$ and current lateral displacement $X_{front}$ of vehicle which are obtained at step S71, and vehicle speed (current vehicle speed) V obtained at step S72. (see FIG. 4)

$$X_S = Tt \cdot V \cdot (\phi + Tt \cdot V \cdot \beta) + X_{front} \quad (29)$$

Where Tt denotes the headway time for calculating the front focal point distance. The front focal point distance is obtained by multiplying headway time Tt by vehicle speed V. Namely, an estimated value of the lateral displacement from the center of traveling lane after the lapse of headway time Tt is the estimated lateral displacement $X_S$ in the future. As recognized in Equation (29), for example if focusing on yaw angle $\phi_{front}$, estimated lateral displacement $X_S$ becomes larger as yaw angle $\phi_{front}$ becomes larger.

Then, the lane departure tendency is judged by comparing estimated lateral displacement $X_S$ with predetermined departure-tendency determining threshold value (lateral displacement limit distance) $X_L$. Departure-tendency determining threshold value $X_L$ is a value from which it can be generally determined that the vehicle tends to depart from the traveling lane. This departure-tendency determining threshold value $X_L$ is a value obtained through experimental trials and experiences. For example, departure-tendency determining threshold value $X_L$ is a value indicating the position of a boundary on the traveling road and is calculated from the following Equation (30). (see FIG. 4)

$$X_L = (L-H)/2 \quad (30)$$

Where L denotes the lane width, and H denotes the width of vehicle. Image pickup section 13 obtains lane width L by processing the pickup image. Moreover, the position of vehicle may be obtained from navigation device 14, and lane width L may be obtained from a map data of navigation device 14.

In the example shown in FIG. 4, departure-tendency determining threshold value $X_L$ is set within the traveling lane of vehicle. However, the lane departure prevention control apparatus according to the present invention is not limited to this, namely departure-tendency determining threshold value $X_L$ may be set outside the traveling lane. Moreover, the lane departure prevention control apparatus according to the present invention is not limited to the configuration that determines the departure tendency before (a portion of) the vehicle actually departs or deviates outside from the traveling lane. Namely for example, a configuration that sets departure-tendency determining threshold value $X_L$, so as to allow the departure tendency to be determined after at least one of four wheels actually departs from the lane (moves outside of the lane) may be employed.

Then, when the following Relation (31) is satisfied; the controller determines that the vehicle has the lane departure tendency, and sets departure judgment flag $F_{out}$ to ON ($F_{out}$=ON).

$$|X_S| \geq X_L \quad (31)$$

On the other hand, when the following Relation (32) is satisfied; the controller determines that the vehicle does not have the lane departure tendency, and sets departure judgment flag $F_{out}$ to OFF ($F_{out}$=OFF).

$$|X_S| < X_L \quad (32)$$

Further, the controller judges departure direction $D_{out}$ on the basis of lateral displacement X. Specifically, when the vehicle is laterally displaced to the left from the center of traveling lane, the left direction is set as departure direction $D_{out}$ ($D_{out}$=LEFT). On the other hand, when the vehicle is laterally displaced to the right from the center of traveling lane, the right direction is set as departure direction $D_{out}$ ($D_{out}$=RIGHT).

Subsequently at step S75, the controller sets or changes the control finish timing of lane departure prevention control. Specifically, the control finish timing is set or changed according to shortage yaw moment $\Delta M_S$ calculated at step S73. This processing of step S75 is executed (becomes effective) when departure judgment flag $F_{out}$ which is set at step S74 (more specifically is finally set at after-mentioned step S76) is ON. In this embodiment, a time (control finish time-point, or elapsed time period from start time point) and a position (control finish position (lateral position)) are defined as the markers (parameters) for the control finish timing. The control finish time-period (or finish time-point) is denoted by $T_{end}$, and the control finish position is denoted by $X_{end}$.

Figure 24:
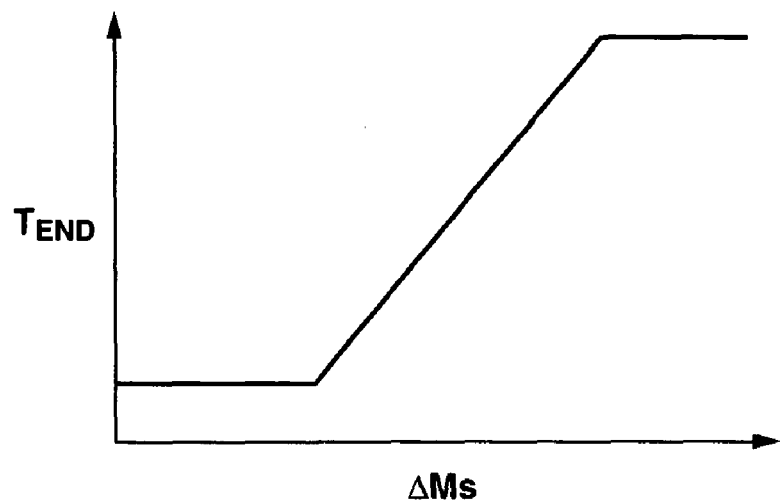
FIG. 24 is a characteristic view showing the relation between a shortage yaw moment $\Delta M_S$ and a control finish time-period $T_{end}$.

FIG. 24 shows one example of the relation between shortage yaw moment $\Delta M_S$ and control finish time-period $T_{end}$. As shown in FIG. 24, control finish time-period $T_{end}$ is a constant small value in a small region of shortage yaw moment $\Delta M_S$. Then, control finish time-period $T_{end}$ increases in proportion to shortage yaw moment $\Delta M_S$ after shortage yaw moment $\Delta M_S$ has reached a certain value. Then, control finish time-period $T_{end}$ becomes a large constant value when shortage yaw moment $\Delta M_S$ further becomes larger.

Figure 25:
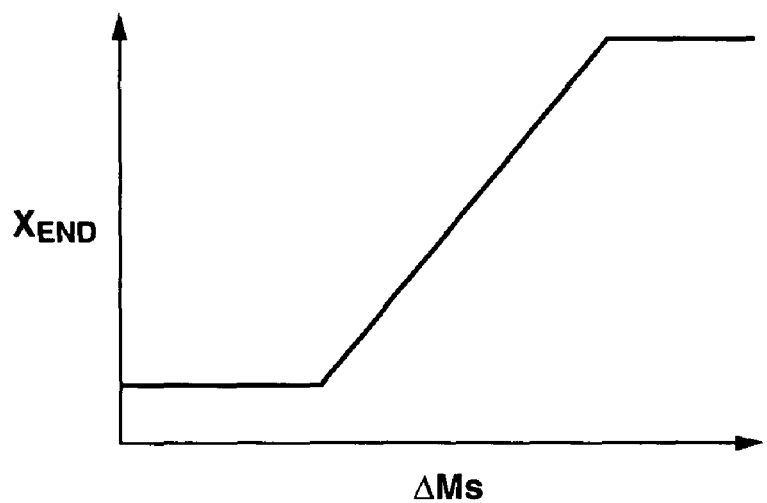
FIG. 25 is a characteristic view showing the relation between shortage yaw moment $\Delta M_S$ and a control finish position $X_{end}$.

FIG. 25 shows one example of the relation between shortage yaw moment $\Delta M_S$ and control finish position $X_{end}$. As shown in FIG. 25, control finish position $X_{end}$ is a constant small value in a small region of shortage yaw moment $\Delta M_S$. Then, control finish position $X_{end}$ increases in proportion to shortage yaw moment $\Delta M_S$ after shortage yaw moment $\Delta M_S$ has reached a certain value. Then, control finish position $X_{end}$ becomes a large constant value when shortage yaw moment $\Delta M_S$ further becomes larger.

For example, the case where shortage yaw moment $\Delta M_S$ is equal to or near 0 means the case where actual yaw moment $M_S r$ is equal to or substantially equal to target yaw moment $M_S b$. Namely, in this case, a desired (ideal) yaw moment has been generated in (applied to) the vehicle by the lane departure prevention control. Control finish time-period $T_{end}$ or control finish position $X_{end}$ at this time is set at a value which does not make an impression on the driver that the lane departure prevention control is being carried out too long, or which prevents the lane departure prevention control from giving a botheration to the driver who is trying to change lanes. In summary, control finish time-period $T_{end}$ and control finish position $X_{end}$ are changed or updated based on thus-set values in accordance with shortage yaw moment $\Delta M_S$.

As mentioned above, referring to FIG. 24 and FIG. 25, control finish time-period $T_{end}$ and control finish position $X_{end}$ are set in accordance with shortage yaw moment $\Delta M_S$.

Subsequently at step S76, the controller judges the driver's intention of lane change. Specifically, the driver's intention of lane change is judged based on the signal of direction indicator switch 20 and steering angle δ obtained at step S71, as follows. When the direction (lighting side of a winker) indicated by the signal of direction indicator switch 20 is the same as the departure direction $D_{out}$ obtained as step S74; it is determined that the driver is intentionally changing the lanes, and departure judgment flag $F_{out}$ is changed to OFF ($F_{out}$=OFF). Namely, the information on the lane departure tendency is changed to the judgment result that the vehicle does not have the tendency to depart from the lane. On the other hand, when the direction (lighting side of winker) indicated by the signal of direction indicator switch 20 is different from departure direction $D_{out}$ obtained as step S74; departure judgment flag $F_{out}$ is maintained at ON ($F_{out}$=ON). Namely, the judgment result that the vehicle has the tendency to depart from the lane is maintained. Thus, in the case where departure judgment flag $F_{out}$ is ON, departure judgment flag $F_{out}$ is kept at ON when the driver is not intentionally changing the lanes.

Subsequently at step S77, the controller carries out a sound output or a display output as the warning for avoiding the lane departure when departure judgment flag $F_{out}$ is ON. As mentioned below, when departure judgment flag $F_{out}$ becomes ON, the yaw moment starts to be applied to the vehicle as the lane departure prevention control. Hence this warning output is carried out at the same time as the applying of moment to the vehicle. However, the output timing of warning is not limited to this. For example, the output timing of warning may be set at a timing before the start timing for applying the yaw moment.

Figure 26:
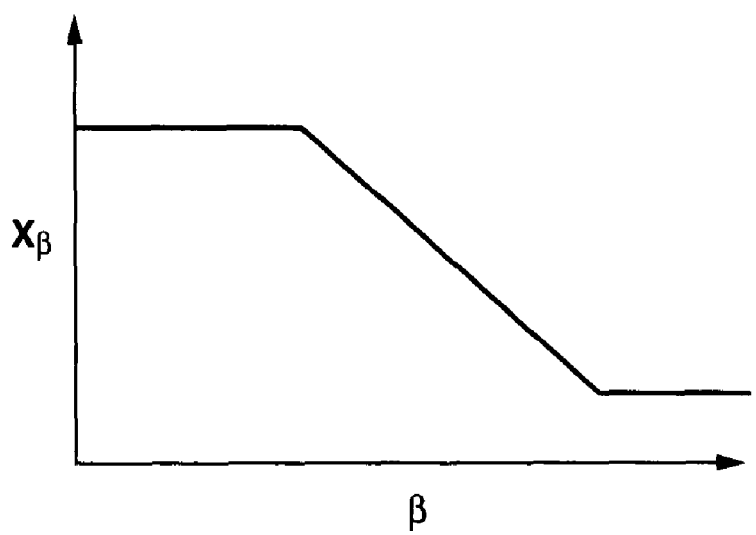
FIG. 26 is a characteristic view showing the relation between a lane curvature β and a decelerating-control determining threshold value $X_β$.

Subsequently at step S78, the controller judges whether or not a decelerating control (hereinafter called, decelerating control for lane departure prevention) that decelerates the vehicle as the lane departure prevention control should be carried out. Specifically, the controller judges whether or not a subtraction value ($|X_S|-X_L$) obtained by subtracting lateral displacement limit distance $X_L$ from estimated lateral displacement $X_S$ calculated at step S74 is greater than or equal to a decelerating-control determining threshold value $X_\beta$. Here, determining threshold value $X_\beta$ is set according to lane curvature β, and its relation is shown in FIG. 26, for example. As shown in FIG. 26, decelerating-control determining threshold value $X_\beta$ is a relatively large constant value in a small region of lane curvature β. Then, decelerating-control determining threshold value $X_\beta$ decreases in response to the increase of lane curvature β after lane curvature β has reached a certain value. Then, decelerating-control determining threshold value $X_\beta$ becomes a relatively small constant value when lane curvature β increases further.

When the subtraction value ($|X_S|-X_L$) is greater than or equal to decelerating-control determining threshold value $X_\beta$ ($|X_S|-X_L \geq X_\beta$); it is determined that the decelerating control should be carried out, and a decelerating-control-operation judgment flag $F_{gs}$ is set to ON. When the subtraction value ($|X_S|-X_L$) is smaller than decelerating-control determining threshold value $X_\beta$ ($|X_S|-X_L < X_\beta$); it is determined that the decelerating control is not carried out, and decelerating-control-operation judgment flag $F_{gs}$ is set to OFF.

Here, the relation between decelerating-control-operation judgment flag $F_{gs}$ and departure judgment flag $F_{out}$ set at step S74 is now explained. At step S74, departure judgment flag $F_{out}$ is set at ON when estimated lateral displacement $X_S$ is larger than or equal to departure-tendency determining threshold value $X_L$ ($|X_S| \geq X_L$). On the other hand, decelerating-control-operation judgment flag $F_{gs}$ is set at ON when the subtraction value ($|X_S|-X_L$) is greater than or equal to decelerating-control determining threshold value $X_\beta$. Because of the relation between these two settings, even if decelerating-control-operation judgment flag $F_{gs}$ is set to ON, decelerating-control-operation judgment flag $F_{gs}$ is set to ON after departure judgment flag $F_{out}$ has been set to ON. Namely, since the after-mentioned applying of yaw moment to the vehicle is started when departure judgment flag $F_{out}$ becomes ON, the decelerating control for vehicle is carried out after the applying of yaw moment has started.

Figure 27:
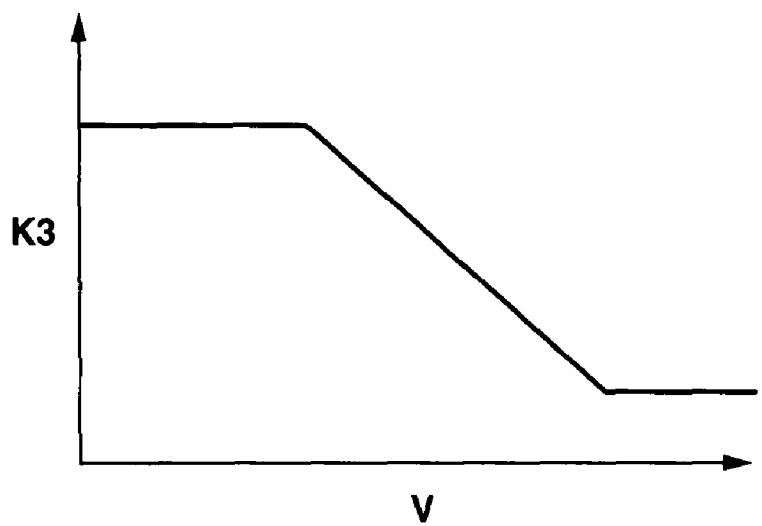
FIG. 27 is a characteristic view showing the relation between vehicle speed v and a gain K3.

Subsequently at step S79, the controller calculates target yaw moment $M_S$. Specifically, the controller calculates basic target yaw moment $M_S0$ (yaw moment out of consideration of the above-mentioned shortage amount) from the following Equation (33) on the basis of estimated lateral displacement $X_S$ and lateral displacement limit distance $X_L$ obtained at step S74.

$$M_S0 = K1 \cdot K3 \cdot (|X_S| - X_L) \tag{33}$$

Where K1 denotes the proportional gain determined from vehicle specifications, and K3 denotes a gain which varies according to vehicle speed V. FIG. 27 shows one example of gain K3. As shown in FIG. 27, gain K3 is a relatively large constant value in a low speed region, then decreases in response to the increase of vehicle speed V after vehicle speed V has reached a certain value, and then becomes a relatively small constant value when vehicle speed V reaches the other certain value.

As recognized in Equation (33), basic yaw moment $M_S0$ becomes larger as the difference between estimated lateral displacement $X_S$ and lateral displacement limit distance $X_L$ becomes larger.

Then, the controller calculates target yaw moment (target yaw moment to be finally applied to the vehicle) $M_S$ from the following Equation (34), as a value obtainable by adding basic yaw moment $M_S0$ calculated by Equation (33) to shortage yaw moment $\Delta M_S$ calculated by Equation (28) at step S73.

$$M_S = M_S0 + \Delta M_S \tag{34}$$

Where, target yaw moment $M_S$ is calculated when departure judgment flag $F_{out}$ is ON. On the other hand, target yaw moment $M_S$ is set to 0 when departure judgment flag $F_{out}$ is OFF.

Subsequently at step S80, the controller calculates a deceleration degree (deceleration) which is necessary for the decelerating control for lane departure prevention. Namely, the controller calculates a braking force for being applied to both of the left and right wheels for the purpose of decelerating the vehicle. More specifically, the controller calculates target braking fluid pressures Pgf and Pgr each of which applies such braking force to both of left and right wheels. (Deceleration-purpose) Target braking fluid pressure Pgf for front wheels is calculated from the following Equation (35) by using estimated lateral displacement $X_S$ and lateral displacement limit distance $X_L$ calculated at step S74, and decelerating-control determining threshold value $X_\beta$ obtained at step S78.

$$Pgf = Kgv \cdot Kgx \cdot (|X_S| - X_L - X_\beta) \tag{35}$$

Figure 28:
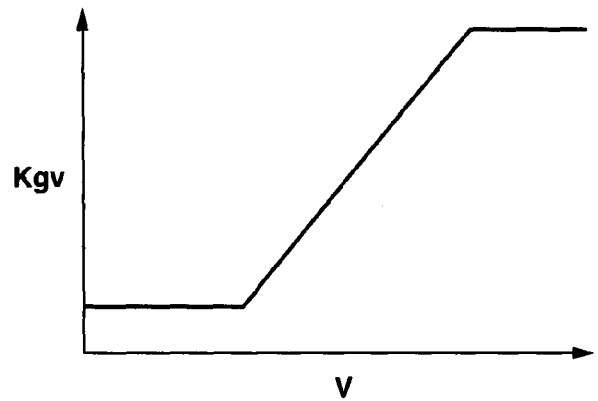
FIG. 28 is a characteristic view showing the relation between vehicle speed v and a conversion factor Kgv.

Where, Kgv is a conversion factor which is set according to vehicle speed V, and Kgx is a conversion factor which is determined from vehicle specifications. FIG. 28 shows one example of conversion factor Kgv. As shown in FIG. 28, conversion factor Kgv is relatively small in a low speed region, then increases in response to the increase of vehicle speed V after vehicle speed V has reached a certain value, and then becomes a relatively large constant value when vehicle speed V reaches the other certain value.

Moreover, target braking fluid pressure Pgr for rear wheels is calculated based on target braking fluid pressure Pgf for front wheels calculated as above, in consideration of a distribution between the front and rear. Thus at step S80, the deceleration degree (deceleration) to be used for the decelerating control for lane departure prevention (concretely, target braking fluid pressures Pgf and Pgr) is obtained.

Subsequently at step S81, the controller calculates the (final) target braking fluid pressure for each wheel. Namely, the final braking fluid pressure is calculated based on presence or absence of the braking or decelerating control for lane departure prevention, and is calculated specifically as follows.

In the case where departure judgment flag $F_{out}$ is OFF, namely in the case where the judgment result that there is not the lane departure tendency is obtained; target braking fluid pressures Psi (i=fl, fr, rl, rr) for respective wheels are set at braking fluid pressure Pmf or Pmr as shown in the following Equations (36) and (37).

$$Psfl = Psfr = Pmf \tag{36}$$

$$Psrl = Psrr = Pmr \tag{37}$$

Where Pmf is a braking fluid pressure for the front wheels. Moreover, Pmr is a braking fluid pressure for the rear wheels and is calculated based on braking fluid pressure Pmf for front wheels in consideration of the distribution between the front and rear. For example, when the driver is operating the brake (pedal), braking fluid pressures Pmf and Pmr take values according to the operation degree of this brake operation.

On the other hand, in the case where departure judgment flag $F_{out}$ is ON, namely in the case where the judgment result that there is the lane departure tendency is obtained; front-wheel target braking-fluid-pressure differential $\Delta Psf$ and rear-wheel target braking-fluid-pressure differential $\Delta Psr$ are calculated on the basis of target yaw moment $M_S$. Specifically, target braking-fluid-pressure differentials $\Delta Psf$ and $\Delta Psr$ are calculated from the following Equations (38) to (41).

In the case of $|M_S| < M_S1$;

$$\Delta Psf = 0 \tag{38}$$

$$\Delta Psr = Kbr \cdot M_S/T \tag{39}$$

In the case of $|M_S| \geq M_S1$;

$$\Delta Psf = Kbf \cdot (M_S/|M_S|) \cdot (|M_S| - M_S1)/T \tag{40}$$

$$\Delta Psr = Kbr \cdot (M_S/|M_S|) \cdot M_S1/T \tag{41}$$

Where $M_S1$ denotes a threshold value for setting. Note that this tread T is prescribed to take an equal value in the front and rear ends for convenience sake. Moreover, Kbf and Kbr are conversion factors respectively related to front wheels and rear wheels which are used for converting the braking force (power) to the braking fluid pressure. Kbf and Kbr are determined from the brake specification.

Thus, the braking force to be generated at wheels is distributed to front and rear ends in accordance with the magnitude of target yaw moment $M_S$. When target yaw moment $M_S$ is smaller than threshold value $M_S1$; front-wheel target braking-fluid-pressure differential $\Delta Psf$ is made equal to 0, and rear-wheel target braking-fluid-pressure differential $\Delta Psr$ is made to take the predetermined value so as to generate a braking force differential between the rear left and right wheels. Moreover, when target yaw moment $M_S$ is greater than or equal to threshold value $M_S1$; each of target brakingfluid-pressure differentials ΔPsf and ΔPsr is made to take its predetermined value so as to generate the braking force differential between the front left and right wheels, and also the braking force differential between the rear left and right wheels.

Then, the controller calculates final target braking fluid pressures Psi (i=fl, fr, rl, rr) for respective wheels, by using the calculated target braking-fluid-pressure differentials ΔPsf and ΔPsr and target braking fluid pressures Pgf and Pgr for the decelerating control. Specifically, final target braking fluid pressures Psi (i=fl, fr, rl, rr) for respective wheels are calculated also referring to decelerating-control-operation judgment flag $F_{gs}$ set at step S78.

Namely, in the case where departure judgment flag $F_{out}$ is ON and decelerating-control-operation judgment flag $F_{gs}$ is OFF, namely when there is the judgment result that the vehicle has the lane departure tendency and the decelerating control is not carried out (i.e., in the case where only the applying of yaw moment to the vehicle is carried out); target braking fluid pressure Psi (i=fl, fr, rl, rr) for each wheel is calculated from the following Equations (42).

$$Psfl=Pmf$$

$$Psfr=Pmf+\Delta Psf$$

$$Psrl=Pmr$$

$$Psrr=Pmr+\Delta Psr \quad (42)$$

Moreover, in the case where departure judgment flag $F_{out}$ is ON and decelerating-control-operation judgment flag $F_{gs}$ is ON, namely in the case where the vehicle is decelerated while applying the yaw moment to the vehicle; target braking fluid pressure Psi (i=fl, fr, rl, rr) for each wheel is calculated from the following Equations (43).

$$Psfl=Pmf+Pgf/2$$

$$Psfr=Pmf+\Delta Psf+Pgf/2$$

$$Psrl=Pmr+Pgr/2$$

$$Psrr=Pmr+\Delta Psr+Pgr/2 \quad (43)$$

As shown in Equations (42) and (43), target braking fluid pressure Psi (i=fl, fr, rl, rr) for each wheel is calculated in consideration of the driver's brake operation namely in consideration of the braking fluid pressures Pmf and Pmr. Then, braking/driving force control unit 8 outputs thus-calculated target braking fluid pressure Psi (i=fl, fr, rl, rr) for each wheel to braking-fluid-pressure control section 7, as the braking-fluid-pressure command value.

Equations (38) to (43) shows the target braking fluid pressure for each wheel and the like, in the case where departure direction $D_{out}$ is LEFT ($D_{out}$=LEFT), namely in the case where the vehicle has the lane departure tendency against the left-side lane marker. However, in the case where departure direction $D_{out}$ is RIGHT ($D_{out}$=RIGHT), namely in the case where the vehicle has the lane departure tendency against the right-side lane marker; the explanations about Equations corresponding to Equations (38) to (43) will be omitted. In the case where departure direction $D_{out}$ is RIGHT, target braking fluid pressure Psi (i=fl, fr, rl, rr) for each wheel is calculated from the following Equations (44) corresponding to Equations (42).

$$Psfl=Pmf+\Delta Psf$$

$$Psfr=Pmf$$

$$Psrl=Pmr+\Delta Psr$$

$$Psrr=Pmr \quad (44)$$

The control finish timing of lane departure prevention control is set (changed) at step S75. Hence, departure judgment flag $F_{out}$ is set (changed) to OFF when the elapsed time from the start of lane departure prevention control reaches control finish time-period $T_{end}$, or when the lateral position of vehicle (actual lateral position X or estimated lateral displacement $X_S$) reaches control finish position $X_{end}$ during operation of lane departure prevention control. Thereby, the lane departure prevention control is terminated.

(Operations)

The operations according to the fifth embodiment will now be explained below. While the vehicle is running (traveling), the controller reads various data (step S71), calculates vehicle speed V, and sets previous vehicle speed $V_{PAST}$ (step S72). Subsequently, the controller calculates shortage yaw moment $\Delta M_S$ by using vehicle speed V, previous vehicle speed $V_{PAST}$, and the like (step S73). Then, the controller sets (changes) the control finish timing for lane departure prevention control, specifically control finish time-period $T_{end}$ and control finish position $X_{end}$ on the basis of the calculated shortage yaw moment $\Delta M_S$ (step S75).

Moreover, the controller calculates future estimated lateral displacement (estimated value of departure) $X_S$, carries out the judgment of lane departure tendency (setting of departure judgment flag $F_{out}$) on the basis of estimated lateral displacement $X_S$ (step S74), and corrects the judgment result (departure judgment flag $F_{out}$) of lane departure tendency on the basis of driver's intention of changing lanes (step S76). Then, the controller carries out the warning output in dependence upon the judgment result of lane departure tendency (step S77).

Moreover, the controller sets decelerating-control-operation judgment flag $F_{gs}$ on the basis of estimated lateral displacement $X_S$ (step S78). Then, the controller calculates target yaw moment $M_S$ to be applied to (produced in) the vehicle as the lane departure prevention control, and the decelerating degree (target braking fluid pressures Pgf and Pgr) for the decelerating control for lane departure prevention (steps S79 and S80). Here, target yaw moment $M_S$ is a value which is obtained by adding shortage yaw moment $\Delta M_S$ to basic target yaw moment $M_S0$ and therefore which compensates for shortage yaw moment $\Delta M_S$.

Then, the controller calculates target braking fluid pressure Psi (i=fl, fr, rl, rr) for each wheel on the basis of target yaw moment $M_S$ and the decelerating degree (target braking fluid pressures Pgf and Pgr), with reference to the statuses of departure judgment flag $F_{out}$ and decelerating-control-operation judgment flag $F_{gs}$; and outputs the calculated target braking fluid pressure Psi (i=fl, fr, rl, rr) for each wheel to braking-fluid-pressure control section 7 (step S81). Thereby, the yaw moment according to (the state of) the lane departure tendency of vehicle is applied to the vehicle, and possibly the vehicle is decelerated. Then, the controller finishes the lane departure prevention control, when the elapsed time from the start of lane departure prevention control reaches control finish time-period $T_{end}$ or when the lateral position of vehicle (actual lateral position X or estimated lateral displacement $X_S$) reaches control finish position $X_{end}$ during operation of lane departure prevention control. Namely when satisfying the above-mentioned condition of control finish timing, the lane departure prevention control is forced to finish irrespective of the lane departure tendency.

(Functions and Effects)

Next, functions and effects according to the fifth embodiment will now be explained below. Control finish time-period $T_{end}$ and control finish position $X_{end}$ for defining or determining the control finish timing of lane departure prevention control are set based on shortage (shortage amount) $\Delta M_S$ of the yaw moment serving as a controlled variable for lane departure prevention control, as described above. At this time, control finish time-period $T_{end}$ and control finish position $X_{end}$ are set to become greater as shortage-amount yaw moment $\Delta M_S$ becomes greater.

Figure 29:
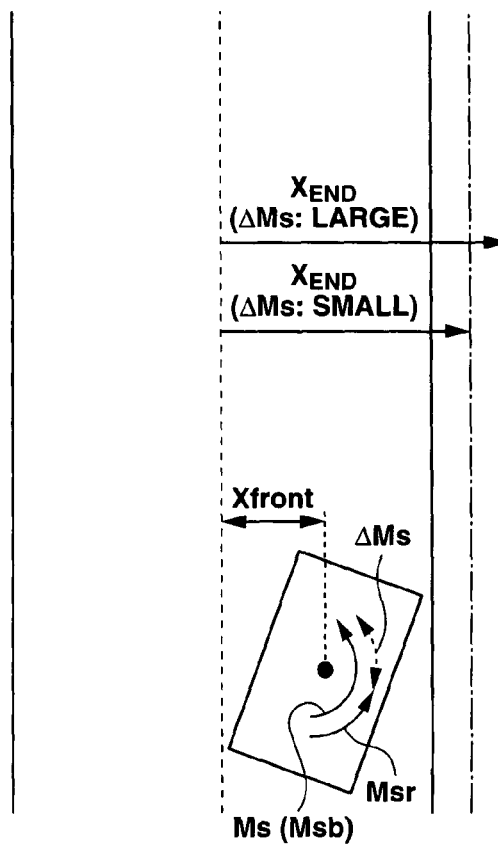
FIG. 29 is a view used for explaining functions and effects according to the fifth embodiment.

For example, FIG. 29 shows a relation between control finish position $X_{end}$ and shortage-amount yaw moment $\Delta M_S$ which is the difference value between actual yaw moment $M_S r$ and previously-calculated target yaw moment $M_S b$. As shown in FIG. 29, control finish position $X_{end}$ becomes larger (is positioned more outside relative to the traveling lane in which the vehicle is running) as shortage yaw moment $\Delta M_S$ becomes larger.

Since control finish time-period $T_{end}$ and control finish position $X_{end}$ are set based on shortage (shortage amount) $\Delta M_S$ of the yaw moment serving as the controlled variable for lane departure prevention control as described above; it can be prevented that the control finish timing comes and thereby the lane departure prevention control is released, when trying to compensate for (or covering) the shortage amount of yaw moment as the lane departure prevention control, namely when applying target yaw moment $M_S$ compensating for shortage yaw moment $\Delta M_S$ to the vehicle. Therefore, the yaw moment (control quantity) necessary for the lane departure prevention for vehicle can be secured.

Further, since control finish time-period $T_{end}$ and control finish position $X_{end}$ are made greater as shortage yaw moment $\Delta M_S$ becomes greater, the control finish timing can be delayed according to shortage yaw moment $\Delta M_S$ even if shortage yaw moment $\Delta M_S$ is great.

It is noted that the lane departure prevention control apparatus according to the fifth embodiment can be modified to have the following configurations. In the fifth embodiment, the time (control finish time-period) and the position (control finish position (lateral position)) are used as markers (parameters) for determining the control finish timing. However, one of these may be used as the marker for the control finish timing. Moreover, a total amount of control quantity (integration value of controlled variable) from the start time of lane departure prevention control, the yaw angle of vehicle relative to (tangent of center line of) traveling lane during the lane departure prevention control, or the like may be used as the marker for determining the control finish timing. For example, if using the yaw angle as the marker for the control finish timing, an arbitrary value of yaw angle having a gradient toward the inner side of the traveling lane on which the vehicle is running is defined as the yaw angle's value for determining the control finish timing.

Further in this embodiment, shortage yaw moment $\Delta M_S$ is (directly) calculated as the difference value between actual yaw moment $M_S r$ and target yaw moment $M_S b$ (see Equation (28)). Contrary to this, shortage yaw moment $\Delta M_S$ can be calculated or estimated also on the basis of a temperature (or its temperature history) or a usage frequency of a brake equipment such as brake pad (or brake shoe), or a vehicle state such as vehicle weight. The temperature and the like of the brake equipment such as brake pad (or brake shoe) influences the braking force, and thereby influences actual yaw moment $M_S r$. Hence, shortage yaw moment $\Delta M_S$ can be calculated or estimated also from the temperature and the like of brake equipment such as brake pad (or brake shoe). In this case, for example, a device for detecting or estimating the temperature of brake equipment is further provided, and a relation between the temperature of brake equipment and a marker (variable) indicating a reduction of braking force is stored as a map in advance. Thereby, shortage yaw moment $\Delta M_S$ is calculated or estimated based on the marker corresponding to the temperature of brake equipment. Moreover, without calculating the shortage yaw moment based on the above-mentioned marker, the difference value between actual yaw moment $M_S r$ and target yaw moment $M_S b$ may be calculated when the marker becomes greater than or equal to a predetermined threshold value. Moreover, shortage yaw moment $\Delta M_S$ can be calculated or estimated also based on an external traveling environment of vehicle (external environment in which the vehicle is traveling) such as weather or ambient air temperature, instead of the state of vehicle.

Further in this embodiment, actual yaw moment $M_S r$ is calculated based on vehicle speed V (Equations (25) to (27)). Contrary to this, actual yaw moment $M_S r$ can be calculated also based on the other value such as yaw rate $\phi'$.

According to the above-described explanations about the fifth embodiment, the computing process shown by FIG. 23 that is executed in braking/driving force control unit 8 roughly achieves the control section (or means) configured to carry out the lane departure prevention control to prevent the vehicle from departing from the lane, and configured to finish the lane departure prevention control by using the predetermined finish parameter. Further, the processing of step S73 that is executed in braking/driving force control unit 8 achieves a control-shortage detecting section (or means) configured to detect the shortage amount of control quantity of the lane departure prevention control carried out by the control section, as the vehicle state after the lane departure prevention control is started. Further, the processing of step S75 that is executed in braking/driving force control unit 8 achieves a control-timing changing section (or means) configured to change the predetermined finish timing of lane departure prevention control on the basis of the shortage amount detected by the control-shortage detecting section.

This application is based on prior Japanese Patent Applications No. 2006-125414 filed on Apr. 28, 2006 and No. 2006-190599 filed on Jul. 11, 2006. The entire contents of these Japanese Patent Applications are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lane departure prevention apparatus comprising:
a control section configured:
to carry out a lane departure prevention control to prevent a vehicle from departing from a lane, and
to finish the lane departure prevention control by using a predetermined finish parameter;
a vehicle-state detecting section configured to detect a state of vehicle at least when or after the lane departure prevention control is started;

a control finish-parameter correcting section configured to correct the predetermined finish parameter on a basis of the vehicle state detected by the vehicle-state detecting section; and a departure tendency expanding degree estimating section configured to estimate an expanding degree of departure tendency of the vehicle relative to the lane, on the basis of the vehicle state detected by the vehicle-state detecting section, wherein the control finish-parameter correcting section is configured to correct the predetermined finish parameter so as to elongate a time period between start and finish of the lane departure prevention control as the expanding degree of departure tendency becomes greater.

2. The lane departure prevention apparatus as claimed in claim 1, wherein the control finish-parameter correcting section is configured to bring the predetermined finish parameter more difficult to be satisfied, as the expanding degree of departure tendency estimated by the departure-tendency-expanding-degree estimating section becomes greater.

3. The lane departure prevention apparatus as claimed in claim 1, wherein:
the control section is configured to continuously vary a control quantity of the lane departure prevention control during the lane departure prevention control, and is configured to decrease the control quantity when finishing the lane departure prevention control; and
the control finish-parameter correcting section is configured to correct a rate of the decrease of control quantity when finishing the lane departure prevention control, the decrease rate of control quantity being the predetermined finish parameter.

4. The lane departure prevention apparatus as claimed in claim 1, wherein the vehicle-state detecting section is configured to detect a yaw angle of the vehicle relative to the lane as the vehicle state when or after the lane departure prevention control is started.

5. The lane departure prevention apparatus as claimed in claim 1, wherein the vehicle-state detecting section is configured to detect at least one of a lateral speed of the vehicle and a lateral acceleration of the vehicle as the vehicle state when or after the lane departure prevention control is started.

6. The lane departure prevention apparatus as claimed in claim 1, wherein:
the vehicle-state detecting section includes a control-shortage detecting section configured to detect a shortage amount of control quantity of the lane departure prevention control carried out by the control section, as the vehicle state after the lane departure prevention control is started; and
the control finish-parameter correcting section includes a control-timing changing section configured to change a predetermined finish timing of the lane departure prevention control on a basis of the shortage amount detected by the control-shortage detecting section.

7. The lane departure prevention apparatus as claimed in claim 6, wherein the control-shortage detecting section is configured to estimate the shortage amount of control quantity of the lane departure prevention control on a basis of at least one of the vehicle state and an external environment in which the vehicle is traveling.

8. The lane departure prevention apparatus as claimed in claim 6, wherein:
the predetermined finish timing is defined by at least one of the following four of:
a duration time of execution of the lane departure prevention control, a lateral displacement of the vehicle relative to the lane during the lane departure prevention control,
an integration value of the control quantity from the start time of lane departure prevention control, and
a yaw angle of the vehicle relative to the lane during the lane departure prevention control.

9. The lane departure prevention apparatus as claimed in claim 1, wherein:
the lane departure prevention apparatus further comprises a driver-intention detecting section configured to detect a driver's intention of driving operation on the basis of a condition of driving operation by the driver; and
the control finish-parameter correcting section is configured to suppress the correction of the predetermined finish parameter in the case where the driver-intention detecting section detects the driver's intention of driving operation.

10. A lane departure prevention apparatus comprising:
a control section configured:
to carry out a lane departure prevention control to prevent a vehicle from departing from a lane, and
to finish the lane departure prevention control by using a predetermined finish parameter;
a vehicle-state detecting section configured to detect a state of vehicle at least when or after the lane departure prevention control is started;
a control finish-parameter correcting section configured to correct the predetermined finish parameter on a basis of the vehicle state detected by the vehicle-state detecting section;
wherein the vehicle-state detecting section includes a control-shortage detecting section configured to detect a shortage amount of control quantity of the lane departure prevention control carried out by the control section, as the vehicle state after the lane departure prevention control is started;
wherein the control finish-parameter correcting section includes a control-timing changing section configured to change a predetermined finish timing of the lane departure prevention control on a basis of the shortage amount detected by the control-shortage detecting section; and
wherein the control-timing changing section is configured to cause the predetermined finish timing to become later as the shortage amount becomes greater.

11. A lane departure prevention apparatus comprising:
a control section configured:
to carry out a lane departure prevention control to prevent a vehicle from departing from a lane, and
to finish the lane departure prevention control by using a predetermined finish parameter;
a vehicle-state detecting section configured to detect a state of vehicle at least when or after the lane departure prevention control is started;
a control finish-parameter correcting section configured to correct the predetermined finish parameter on a basis of the vehicle state detected by the vehicle-state detecting section;
wherein the vehicle-state detecting section includes a control-shortage detecting section configured to detect a shortage amount of control quantity of the lane departure prevention control carried out by the control section, as the vehicle state after the lane departure prevention control is started;
wherein the control finish-parameter correcting section includes a control-timing changing section configured to change a predetermined finish timing of the lane departure prevention control on a basis of the shortage amount detected by the control-shortage detecting section;

wherein the control section is configured to carry out the lane departure prevention control by applying a yaw moment to the vehicle to prevent the vehicle from departing from the lane; and wherein the control-shortage detecting section is configured to detect the shortage amount of control quantity of the lane departure prevention control from the difference between:
- a target yaw moment applied to the vehicle by the control section as the control quantity and
- an actual yaw moment actually generated in the vehicle by applying the target yaw moment.

12. A lane departure prevention apparatus comprising:

control means for:
- carrying out a lane departure prevention control to prevent a vehicle from departing from a lane, and
- finishing the lane departure prevention control by using a predetermined finish parameter;

vehicle-state detecting means for detecting a state of vehicle at least when or after the lane departure prevention control is started; and control finish parameter correcting means for correcting the predetermined finish parameter on a basis of the vehicle state detected by the vehicle-state detecting means; and departure tendency expanding degree estimating means for estimating an expanding degree of departure tendency of the vehicle relative to the lane, on the basis of the vehicle state detected by the vehicle-state detecting means, wherein the control finish-parameter correcting means is configured to correct the predetermined finish parameter so as to elongate a time period between start and finish of the lane departure prevention control as the expanding degree of departure tendency becomes greater.

13. A lane departure prevention method comprising:

starting a lane departure prevention control to prevent a vehicle from departing from a lane;

detecting a state of vehicle at least when or after the lane departure prevention control is started;

correcting a predetermined finish parameter of the lane departure prevention control on a basis of the detected vehicle state;

finishing the lane departure prevention control by using the predetermined finish parameter;

estimating an expanding degree of departure tendency of the vehicle relative to the lane, on the basis of the detected vehicle state; and correcting the predetermined finish parameter so as to elongate a time period between start and finish of the lane departure prevention control as the expanding degree of departure tendency becomes greater.

* * * * *